(12) United States Patent
Paz et al.

(10) Patent No.: US 12,244,528 B2
(45) Date of Patent: Mar. 4, 2025

(54) AMPLITUDE MODULATED PHASE TRACKING REFERENCE SIGNALS

(71) Applicant: QUALCOMM Incorporated, San Diego, CA (US)

(72) Inventors: Daniel Paz, Tirat Carmel (IL); Michael Levitsky, Rehovot (IL); Assaf Touboul, Netanya (IL); Idan Michael Horn, Hod Hasharon (IL); Shay Landis, Hod Hasharon (IL); Ory Eger, Tel Aviv (IL); Gideon Shlomo Kutz, Ramat Hasharon (IL); Amit Bar-Or Tillinger, Petach Tikva (IL)

(*) Notice: Subject to any disclaimer, the term of this patent is extended or adjusted under 35 U.S.C. 154(b) by 0 days.

(21) Appl. No.: 17/243,213

(22) Filed: Apr. 28, 2021

(65) Prior Publication Data

US 2021/0367726 A1     Nov. 25, 2021

Related U.S. Application Data

(60) Provisional application No. 63/027,053, filed on May 19, 2020.

(51) Int. Cl.
*H04L 5/00* (2006.01)
*H04L 1/00* (2006.01)
*H04L 27/04* (2006.01)

(52) U.S. Cl.
CPC .......... *H04L 5/0048* (2013.01); *H04L 1/0061* (2013.01); *H04L 27/04* (2013.01)

(58) Field of Classification Search
CPC ... H04L 1/0025; H04L 1/0061; H04L 5/0007; H04L 5/0048; H04L 5/0053; H04L 5/0091; H04L 27/04; H04L 27/2602; H04L 27/2613; H04B 7/0837
See application file for complete search history.

(56) References Cited

U.S. PATENT DOCUMENTS

| | | | | |
|---|---|---|---|---|
| 6,566,944 | B1* | 5/2003 | Pehlke | H03F 1/0233 |
| | | | | 330/136 |
| 2012/0082265 | A1* | 4/2012 | Ikedo | H04B 1/0483 |
| | | | | 375/300 |
| 2016/0119035 | A1 | 4/2016 | Iida et al. | |
| 2018/0205528 | A1* | 7/2018 | Bai | H04L 5/0005 |
| 2019/0296877 | A1 | 9/2019 | Zhang et al. | |
| 2019/0306923 | A1* | 10/2019 | Xiong | H04J 13/0062 |
| 2019/0342137 | A1 | 11/2019 | Zhang et al. | |
| 2019/0356515 | A1 | 11/2019 | Murakami et al. | |
| 2019/0379509 | A1* | 12/2019 | Stauffer | H04L 5/0048 |
| 2020/0052950 | A1* | 2/2020 | Manolakos | H04L 27/2657 |

(Continued)

FOREIGN PATENT DOCUMENTS

| | | |
|---|---|---|
| CN | 109088840 A | 12/2018 |
| EP | 3611892 A1 | 2/2020 |

OTHER PUBLICATIONS

International Search Report and Written Opinion—PCT/US2021/070486—ISA/EPO—Aug. 18, 2021.

*Primary Examiner* — David B Lugo

(57) ABSTRACT

Various aspects of the present disclosure generally relate to wireless communication. In some aspects, a user equipment may transmit a request, for an uplink transmission or a downlink transmission, for amplitude modulated phase tracking reference signals; and communicate the uplink transmission or the downlink transmission based at least in part on the request. Numerous other aspects are provided.

30 Claims, 13 Drawing Sheets

(56) References Cited

U.S. PATENT DOCUMENTS

2021/0211242 A1\* 7/2021 Andgart ............... H04L 1/1864
2021/0376978 A1\* 12/2021 Paz ...................... H04L 1/1607
2022/0094496 A1\* 3/2022 Xiong .................... H04L 5/001
2022/0116171 A1\* 4/2022 Zhang ................... H04L 1/0025

\* cited by examiner

AMPLITUDE MODULATED PHASE TRACKING REFERENCE SIGNALS

CROSS-REFERENCE TO RELATED APPLICATION

This Patent Applications claims priority to Provisional Patent Application No. 63/027,053, filed on May 19, 2020, entitled "AMPLITUDE MODULATED PHASE TRACKING REFERENCE SIGNALS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for amplitude modulated phase tracking reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a UE, may include transmitting a request, for an uplink transmission or a downlink transmission, for amplitude modulated phase tracking reference signals (PT-RSs); and communicating the uplink transmission or the downlink transmission based at least in part on the request.

In some aspects, a method of wireless communication, performed by a UE, may include transmitting an indication of a capability of the UE to communicate one or more of uplink transmissions or downlink transmissions having amplitude modulated PT-RSs; and communicating an uplink transmission or a downlink transmission based at least in part on the indication.

In some aspects, a method of wireless communication, performed by a base station, may include receiving a request, for an uplink transmission from a UE or a downlink transmission to the UE, for amplitude modulated PT-RSs; and communicating an uplink transmission or a downlink transmission based at least in part on the request.

In some aspects, a method of wireless communication, performed by a base station, may include receiving an indication of a capability of a UE to communicate one or more of uplink transmissions or downlink transmissions having amplitude modulated PT-RSs; and communicating an uplink transmission or a downlink transmission based at least in part on the indication.

In some aspects, a UE for wireless communication may include a memory and one or more processors operatively coupled to the memory. The memory and the one or more processors may be configured to transmit a request, for an uplink transmission or a downlink transmission, for amplitude modulated PT-RSs; and communicate the uplink transmission or the downlink transmission based at least in part on the request.

In some aspects, a UE for wireless communication may include a memory and one or more processors operatively coupled to the memory. The memory and the one or more processors may be configured to transmit an indication of a capability of the UE to communicate one or more of uplink transmissions or downlink transmissions having amplitude modulated PT-RSs; and communicate an uplink transmission or a downlink transmission based at least in part on the indication.

In some aspects, a base station for wireless communication may include a memory and one or more processors operatively coupled to the memory. The memory and the one or more processors may be configured to receive a request, for an uplink transmission from a UE or a downlink transmission to the UE, for amplitude modulated PT-RSs; and communicate an uplink transmission or a downlink transmission based at least in part on the request.

In some aspects, a base station for wireless communication may include a memory and one or more processors operatively coupled to the memory. The memory and the one or more processors may be configured to receive an indication of a capability of a UE to communicate one or more of uplink transmissions or downlink transmissions having amplitude modulated PT-RSs; and communicate an uplink transmission or a downlink transmission based at least in part on the indication.

In some aspects, a non-transitory computer-readable medium may store one or more instructions for wireless communication. The one or more instructions, when executed by one or more processors of a UE, may cause the one or more processors to transmit a request, for an uplink transmission or a downlink transmission, for amplitude modulated PT-RSs; and communicate the uplink transmission or the downlink transmission based at least in part on the request.

In some aspects, a non-transitory computer-readable medium may store one or more instructions for wireless communication. The one or more instructions, when executed by one or more processors of a UE, may cause the one or more processors to transmit an indication of a capability of the UE to communicate one or more of uplink transmissions or downlink transmissions having amplitude modulated PT-RSs; and communicate an uplink transmission or a downlink transmission based at least in part on the indication.

In some aspects, a non-transitory computer-readable medium may store one or more instructions for wireless communication. The one or more instructions, when executed by one or more processors of a base station, may cause the one or more processors to receive a request, for an uplink transmission from a UE or a downlink transmission to the UE, for amplitude modulated PT-RSs; and communicate an uplink transmission or a downlink transmission based at least in part on the request.

In some aspects, a non-transitory computer-readable medium may store one or more instructions for wireless communication. The one or more instructions, when executed by one or more processors of a base station, may cause the one or more processors to receive an indication of a capability of a UE to communicate one or more of uplink transmissions or downlink transmissions having amplitude modulated PT-RSs; and communicate an uplink transmission or a downlink transmission based at least in part on the indication.

In some aspects, an apparatus for wireless communication may include means for transmitting a request, for an uplink transmission or a downlink transmission, for amplitude modulated PT-RSs; and means for communicating the uplink transmission or the downlink transmission based at least in part on the request.

In some aspects, an apparatus for wireless communication may include means for transmitting an indication of a capability of the apparatus to communicate one or more of uplink transmissions or downlink transmissions having amplitude modulated PT-RSs; and means for communicating an uplink transmission or a downlink transmission based at least in part on the indication.

In some aspects, an apparatus for wireless communication may include means for receiving a request, for an uplink transmission from a UE or a downlink transmission to the UE, for amplitude modulated PT-RSs; and means for communicating an uplink transmission or a downlink transmission based at least in part on the request.

In some aspects, an apparatus for wireless communication may include means for receiving an indication of a capability of a UE to communicate one or more of uplink transmissions or downlink transmissions having amplitude modulated PT-RSs; and means for communicating an uplink transmission or a downlink transmission based at least in part on the indication.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
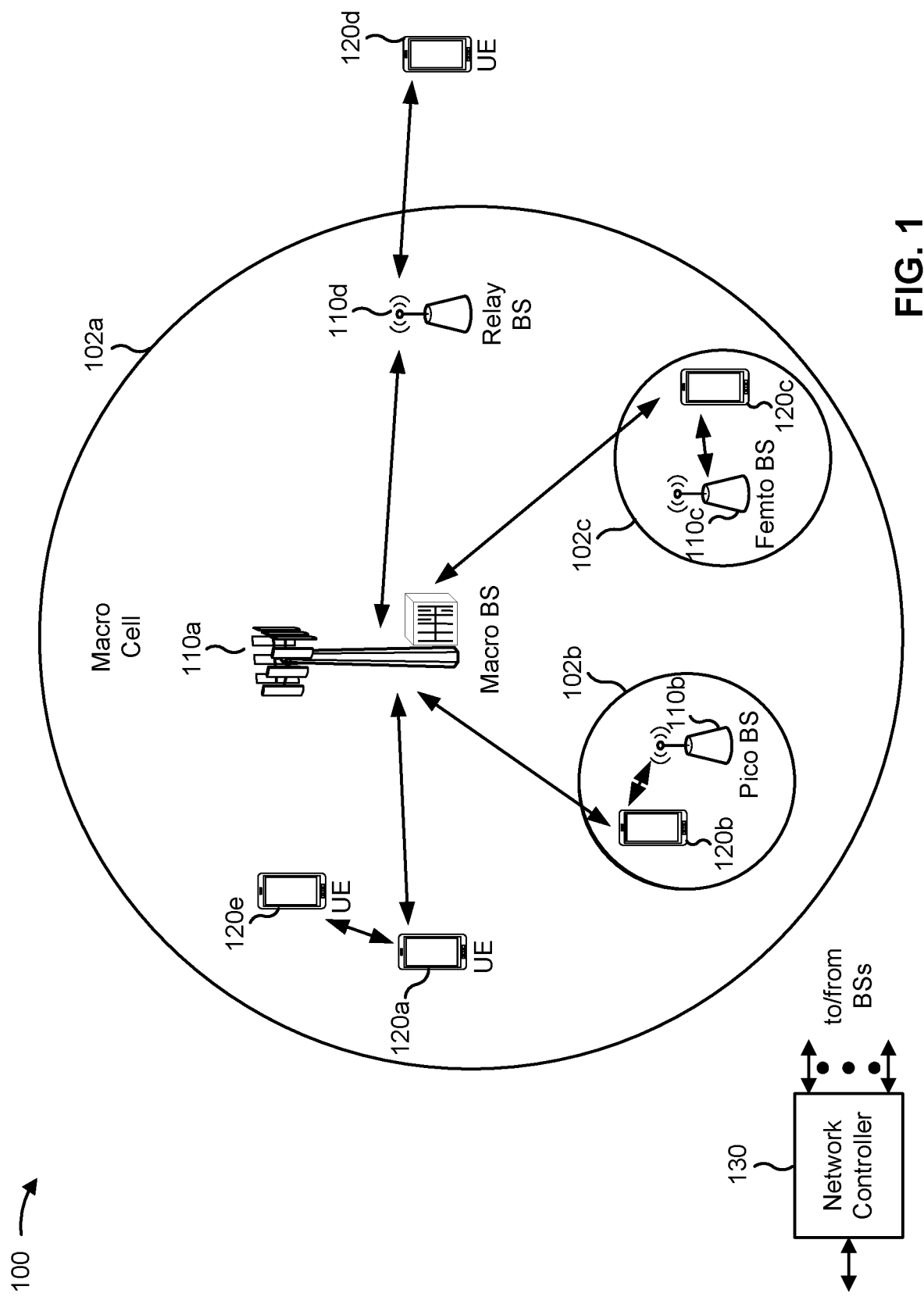
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
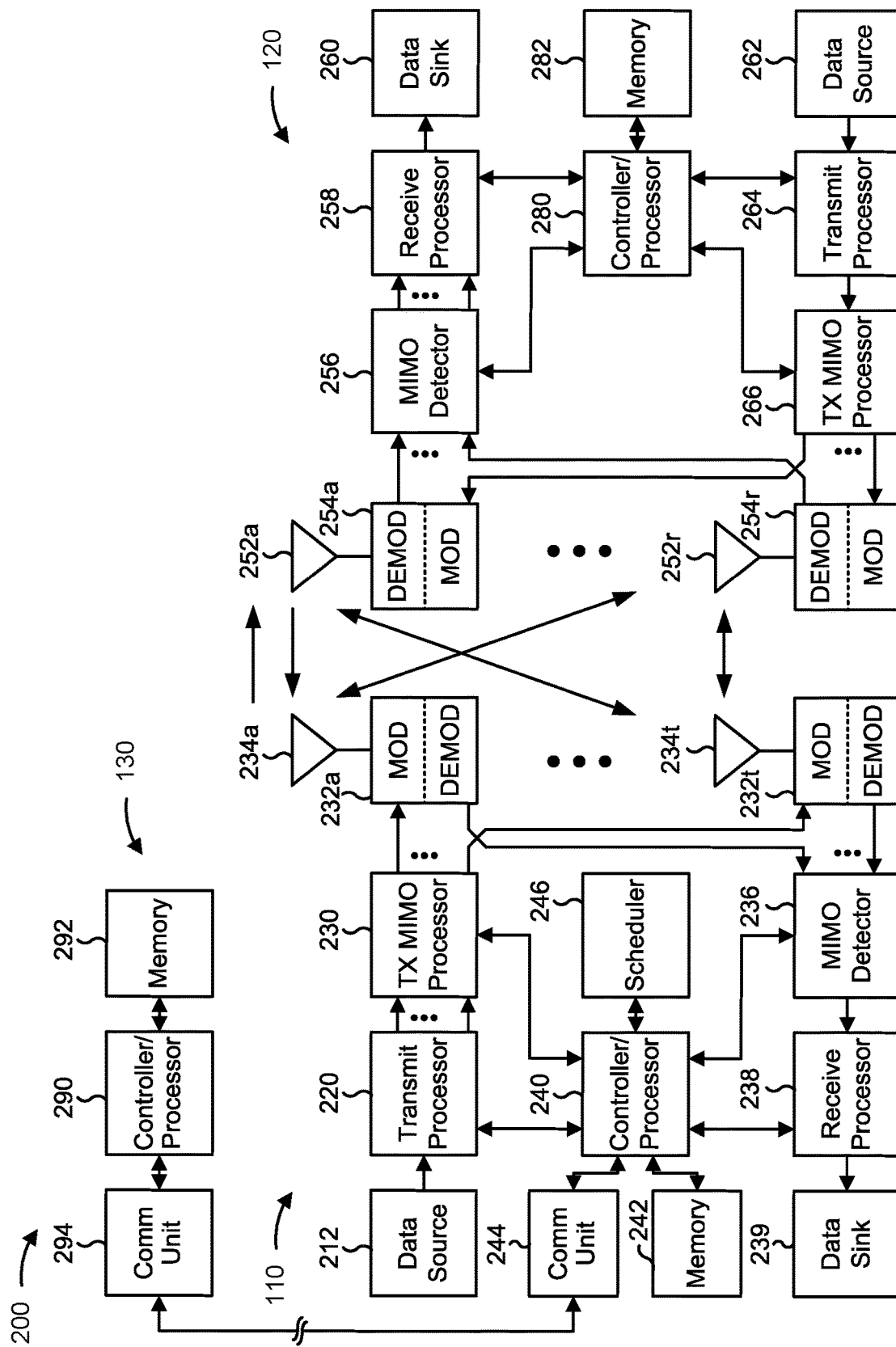
FIG. 2 is a diagram illustrating an example of a base station in communication with a UE in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor May determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with amplitude modulated PT-RSs, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, process 1100 of FIG. 11, process 1200 of FIG. 12, and/or other processes as described herein. A scheduler 246 may schedule UEs for data transmission on the downlink and/or uplink.

In some aspects, UE 120 may include means for transmitting a request, for an uplink transmission or a downlink transmission, for amplitude modulated PT-RSs; means for communicating the uplink transmission or the downlink transmission based at least in part on the request; and/or the like. In some aspects, UE 120 may include means for transmitting an indication of a capability of the UE to communicate one or more of uplink transmissions or downlink transmissions having amplitude modulated PT-RSs; means for communicating an uplink transmission or a downlink transmission based at least in part on the indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving a request, for an uplink transmission from a UE or a downlink transmission to the UE, for amplitude modulated PT-RSs; means for communicating an uplink transmission or a downlink transmission based at least in part on the request; and/or the like. In some aspects, base station 110 may include means for receiving an indication of a capability of a UE to communicate one or more of uplink transmissions or downlink transmissions having amplitude modulated PT-RSs; means for communicating an uplink transmission or a downlink transmission based at least in part on the indication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
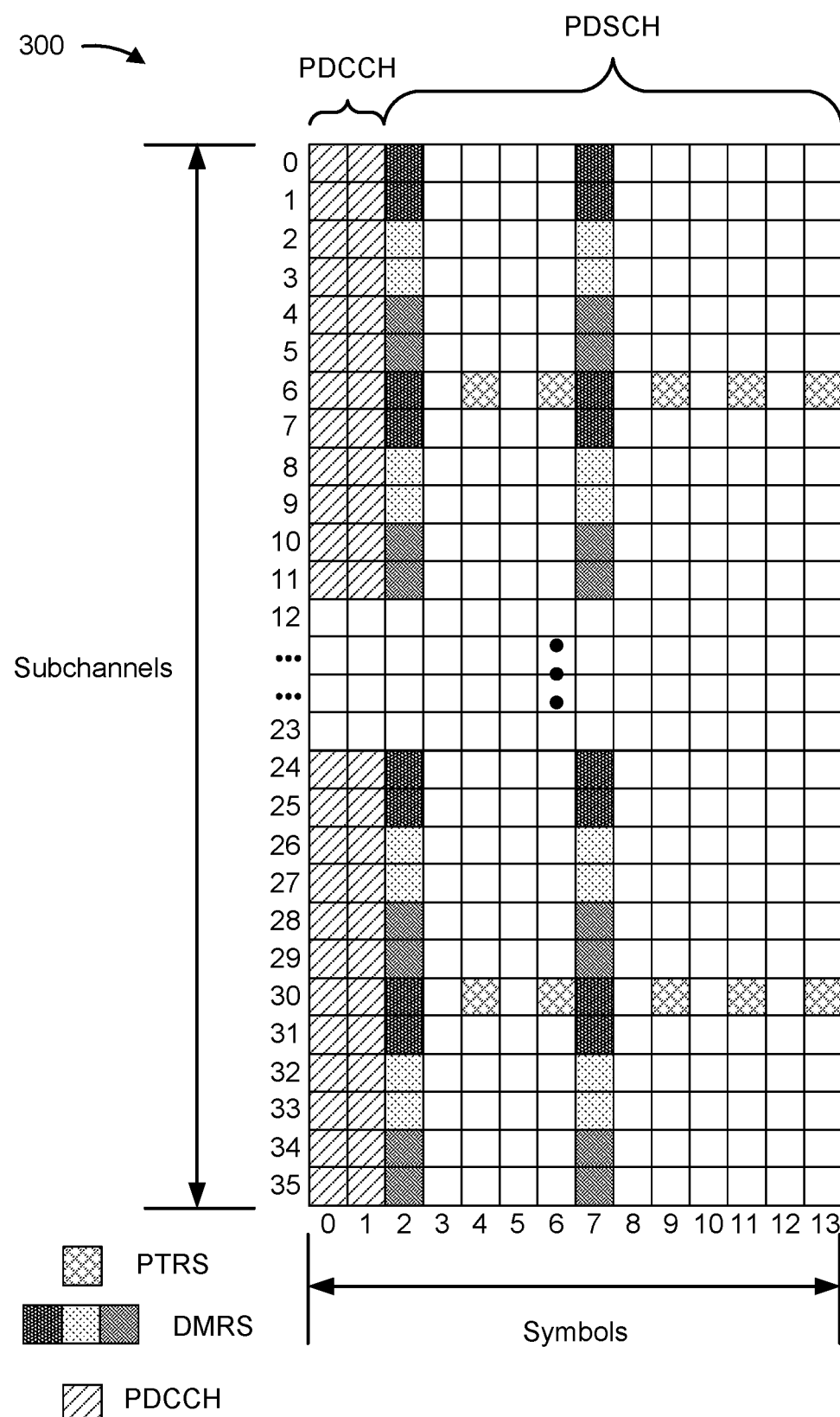
FIG. 3 is a diagram illustrating an example phase tracking reference signal structure in a physical downlink shared channel, in accordance with various aspects of the present disclosure.

FIG. 3 is a diagram illustrating an example 300 phase tracking reference signal (PT-RS) structure in a physical downlink shared channel (PDSCH), in accordance with various aspects of the present disclosure. As shown, the PDSCH may include a number of subchannels (e.g., 36 subchannels) and a number of symbols (e.g., 14 symbols).

A base station may transmit, and a UE may receive (e.g., or attempt to receive) PT-RSs, demodulation reference signals (DMRSs), data, and/or the like using the PDSCH. Although described with reference to a PDSCH, the structure may be similarly applied to a physical uplink shared channel (PUSCH).

The PT-RSs may be a pilot for the PDSCH and may have a density in a frequency domain (e.g., relative to subcarriers) and a time domain (e.g., relative to symbols allocated for data). As shown in FIG. 3, the PT-RSs may have a density of ½ in the time domain and a density of 1/24 (e.g., 1 per resource block) in a frequency domain. The UE may receive the PT-RSs via a single port (e.g., port 1000) or multiple ports.

In some examples, the PT-RSs may be allocated using 1 resource (e.g., a resource element or a subchannel) per 2 resource blocks, 1 resource per 4 resource blocks, and/or the like. In some examples, the PT-RSs may be allocated using 1 resource element of a resource block per 1 symbol, 1 resource element of a resource block per 2 symbols, 1 resource element of a resource block per 4 symbols, and/or the like. A configuration of the PT-RSs may be configured (e.g., using radio resource control (RRC) signaling) and/or may be based at least in part on an associated MCS of the PDSCH. The PT-RSs may be defined by a Gold sequence.

As shown, the PDSCH may have a number (e.g., 2) of single-symbol DMRSs of a DMRS type (e.g., DMRS type 2). For example, the PDSCH may have 1 DMRS symbol per resource block. A receiving device may use the DMRS to roughly estimate and/or correct a frequency error within the symbol that includes the DMRS.

A PDSCH or a PUSCH may include PT-RSs for a receiving device (e.g., a UE, a base station, and/or the like) to account for residual frequency offset (e.g., a frequency offset that is developed within a resource block or slot), phase noise (e.g., introduced by an oscillator at a transmitting device, the receiving device, and/or the like), a common phase error (e.g., a common phase rotation of subcarriers of the PDSCH, the PUSCH, and/or the like), and/or the like. For example, a receiving device may use the PT-RSs to estimate and/or correct phase noise (e.g., based at least in part on a detected residual frequency offset, a common phase error (CPE), and/or the like).

However, using PT-RSs in dedicated symbols that may otherwise be allocated to data (e.g., application data) in the PDSCH may reduce a potential throughput of the PDSCH. In some examples, dedicated symbols allocated for the PT-RSs may include 1/24 (about 4.16%) of symbols of the PDSCH. By allocating resources for PT-RSs, a UE and/or a base station may consume computing, communication, and/or network resources to schedule additional resources to compensate for a reduction of throughput by consuming resources for the PT-RSs.

As indicated above, FIG. 3 is provided as an example. Other examples may differ from what is described with respect to FIG. 3.

In some aspects described herein, a UE and a base station may communicate with amplitude modulated PT-RSs. In other words, a PDSCH or a PUSCH may be transmitted having data multiplexed, via amplitude modulation, with a PT-RS sequence in resources allocated for PT-RSs. In some aspects, the UE may transmit an indication of a capability to communicate with amplitude modulated PT-RSs (e.g., with resources that would otherwise have been dedicated to PT-RSs without additional data). In some aspects, the base station may transmit an indication (e.g., in downlink control information (DCI), a configured grant, and/or the like) that one or more uplink transmissions or downlink transmissions are to be communicated (e.g., transmitted or received) with amplitude modulated PT-RSs. In some aspects, the UE may transmit a request to communicate one or more uplink transmissions or downlink transmissions having amplitude modulated PT-RSs. In some aspects, the base station may transmit a request to communicate one or more uplink transmissions or downlink transmissions with amplitude modulated PT-RSs.

Based at least in part on the UE indicating a capability to communicate with amplitude modulated PT-RSs and/or the UE requesting to communicate with amplitude modulated PT-RSs, the base station and/or the UE may conserve computing, communication, and/or network resources that may otherwise have been used to schedule additional resources to compensate for using dedicated resources for PT-RSs. In some aspects, a throughput of a PDSCH or a PUSCH may improve by about 2%.

Figure 4:
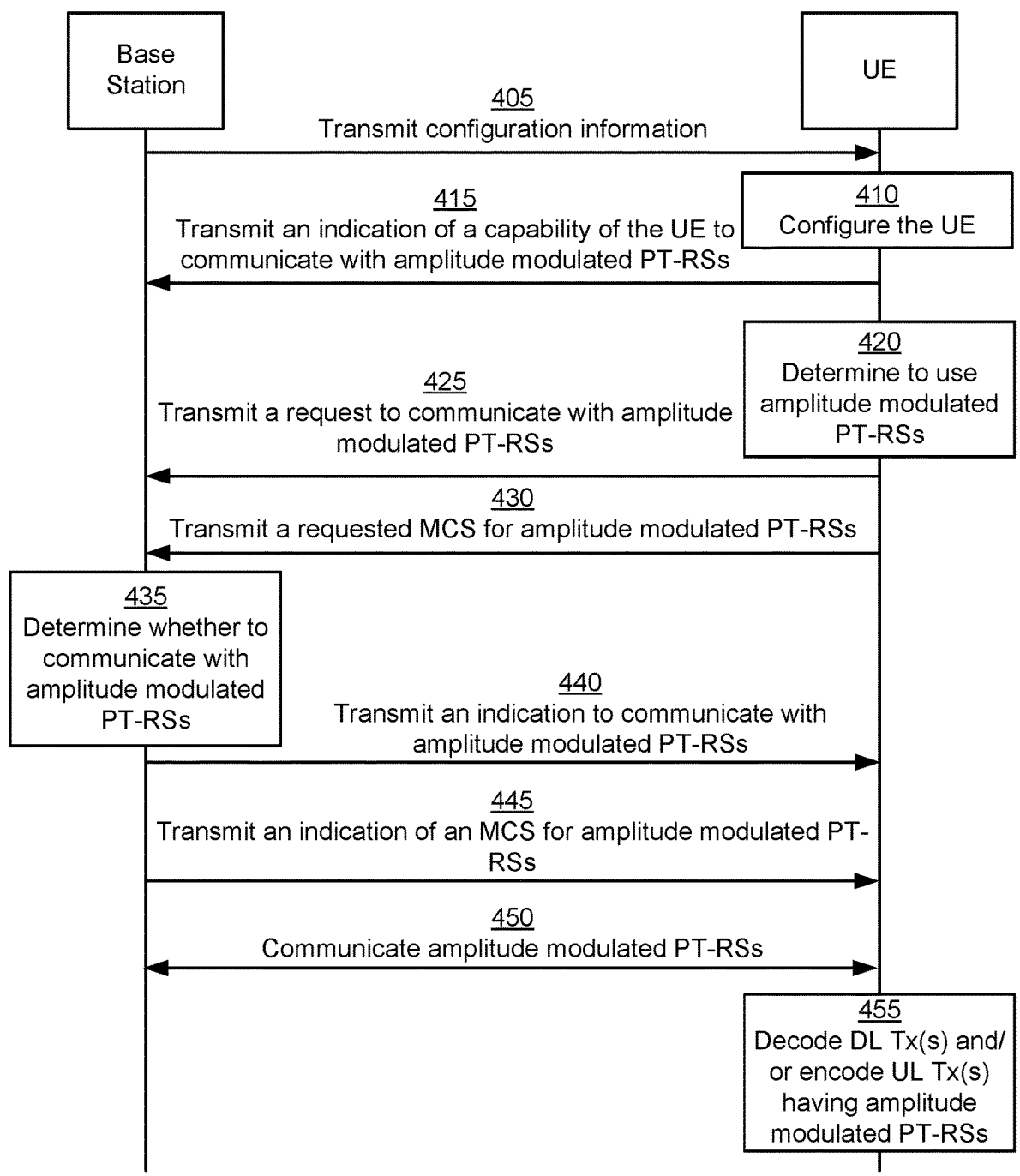
FIG. 4 is a diagram illustrating an example of amplitude modulated phase tracking reference signals, in accordance with various aspects of the present disclosure.

FIG. 4 is a diagram illustrating an example 400 of amplitude modulated PT-RSs, in accordance with various aspects of the present disclosure. As shown in FIG. 4, a UE (e.g., UE 120) may communicate with a base station (e.g., base station 110). The UE and the base station may be part of a wireless network (e.g., wireless network 100).

As shown by reference number 405, the base station may transmit, and the UE may receive, configuration information. In some aspects, the UE may receive configuration information from another device (e.g., from another base station, another UE, and/or the like). In some aspects, the UE may receive the configuration information via one or more of RRC signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to provide an indication of a capability of the UE to communicate with amplitude modulated PT-RSs (e.g., for a PUSCH, a PDSCH, and/or the like). In some aspects, the configuration information may indicate that the base station may communicate with amplitude modulated PT-RSs. For example, the base station may be configured to communicate with amplitude modulated PT-RSs based at least in part on receiving a request from the UE, based at least in part on a determination by the base station that dedicated PT-RSs are unnecessary, and/or the like.

In some aspects, the configuration information may indicate that the base station is to provide an indication of whether amplitude modulated PT-RSs are enabled. In some aspects, the configuration information may indicate that the UE is to be configured to communicate with amplitude modulated PT-RSs for a single transmission (e.g., uplink or downlink), a specified number of transmissions, a set of transmissions scheduled by a configured grant, transmissions within a specified time period, and/or the like.

In some aspects, the configuration information may indicate an MCS for symbols used for amplitude modulated PT-RSs. In some aspects, the configuration may indicate a difference in MCS between symbols that are used for amplitude modulated PT-RSs and symbols used to transmit other data (e.g., in resources that are not configured for pilots). In some aspects, the configuration information may indicate a maximum MCS for symbols used for amplitude modulated PT-RSs.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may transmit, and the base station may receive, an indication of a capability of the UE to communicate (e.g., one or more of uplink transmissions or downlink transmissions) using amplitude modulated PT-RSs. For example, the UE may indicate a capability of the UE to communicate using amplitude modulated PT-RSs based at least in part on the UE being configured to determine and correct at least a portion of common phase error (CPE) using amplitude modulated PT-RSs. In some aspects, the UE may transmit the indication via RRC signaling, one or more MAC CEs, a physical uplink control channel (PUCCH) message, and/or the like.

As shown by reference number 420, the UE may determine to use amplitude modulated PT-RSs for transmit uplink transmissions and/or receive downlink transmissions. In some aspects, the UE may determine to communicate using amplitude modulated PT-RSs based at least in part on one or more metrics, such as an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE satisfying a threshold, a signal to interference plus noise ratio (SINR) that satisfies a threshold, and/or the like. In some aspects, the UE may determine to communicate using amplitude modulated PT-RSs based at least in part on current metrics, predicted metrics, and/or the like.

As shown by reference number 425, the UE may transmit, and the base station may receive, a request to communicate using amplitude modulated PT-RSs. In some aspects, the UE may transmit the request via a PUSCH transmission. In some aspects, the request may include a single bit indicator of whether or not amplitude modulated PT-RSs are requested for one transmission (uplink or downlink), a set of transmissions, and/or the like.

For example, the UE may transmit a request, for one or more uplink transmissions or one or more downlink transmissions, to use amplitude modulated PT-RSs. In some aspects, the request may apply to a single subsequent downlink transmission or uplink transmission, a set of downlink transmissions or a set of uplink transmissions scheduled by a configured grant, a specified number of downlink transmissions or uplink transmissions, downlink transmissions or uplink transmissions within a specified time period, and/or the like. In some aspects, the request may include the indication of the capability of the UE to communicate with amplitude modulated PT-RSs. For example, the request may include an explicit indication of the capability of the UE, may include an implicit indication of the capability of the UE (e.g., the request may imply that the UE is capable of communicating with amplitude modulated PT-RSs), and/or the like.

As shown by reference number 430, the UE may transmit, and the base station may receive, a requested MCS for amplitude modulated PT-RSs. For example, the UE may transmit a request for an MCS for symbols associated with the amplitude modulated PT-RSs. In some aspects, the request may explicitly indicate a requested MCS, may indicate a requested difference between an MCS for symbols associated with amplitude modulated PT-RSs and an MCS for symbols associated with other data, and/or the like. In some aspects, the UE may transmit the request for the MCS with the request for amplitude modulated PT-RSs, with the indication of the capability of the UE to communicate with amplitude modulated PT-RSs, and/or the like.

As shown by reference number 435, the base station may determine whether to communicate with amplitude modulated PT-RSs. For example, the base station may determine whether to comply with a request from the UE to communicate using amplitude modulated PT-RSs, the base station may determine, independently from a request from the UE, to communicate using amplitude modulated PT-RSs, and/or the like. In some aspects, the base station may determine to comply, or to not comply, with a request from the UE based at least in part on one or more metrics, such as an amount of buffered data for a downlink transmission, a size of a resource grant of an associated transmission (e.g., to which the request applies), an RSRP associated with the UE, movement of the UE, MCS for upcoming communications, a predicted change of conditions for SINR, and/or the like.

In some aspects, the base station may determine, independently from a request from the UE, to communicate (e.g., uplink transmissions or downlink transmissions) with amplitude modulated PT-RSs based at least in part on one or more metrics, such as a network load associated with the base station, an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE satisfying a threshold, an SINR that satisfies a threshold, a capability of the UE to communicate with amplitude modulated PT-RSs, and/or the like. In some aspects, the base station may determine whether to communicate using amplitude modulated PT-RSs based at least in part on current metrics, predicted metrics, and/or the like.

As shown by reference number 440, the base station may transmit, and the UE may receive, an indication to communicate using amplitude modulated PT-RSs. For example, the indication may indicate that the base station has approved a request from the UE, that the base station has determined to communicate using amplitude modulated PT-RSs (e.g., independently from, or without, a request from the UE), and/or the like. In some aspects, the base station may transmit the indication, based at least in part on receiving the indication of the capability of the UE, that resources that would otherwise have been allocated for dedicated PT-RSs are to be allocated for amplitude modulated PT-RSs. In some aspects, the base station may provide the indication via a DCI message (e.g., using one or more bits), a MAC CE, RRC signaling, and/or the like.

As shown by reference number 445, the base station may transmit, and the UE may receive, an indication of an MCS for amplitude modulated PT-RSs. In other words, the base station may transmit an indication of an MCS for symbols associated with the amplitude modulated PT-RSs.

In some aspects, the MCS may be based at least in part on feedback signaling associated with a previous communication (e.g., via an outer ring adaptation loop). For example, the UE may transmit acknowledgement or negative acknowledgement (ACK/NACK) signaling for a downlink transmission from the base station for a previous transmission having amplitude modulated PT-RSs. Based at least in part on a receiving an ACK, the base station may indicate an increase in the MCS, no change to the MCS, no indication for the MCS (e.g., implying no change to the MCS), and/or the like. Based at least in part on receiving a NACK, the base station may indicate a decrease in MCS, no change to the MCS, and/or the like. In some aspects, the base station may indicate a change to the MCS with an explicit indication, a relative indication (e.g., an MCS relative to an MCS of a previous transmission), and/or the like.

Similarly, the base station may transmit ACK/NACK signaling for an uplink transmission from the UE for a previous transmission having amplitude modulated PT-RSs. Based at least in part on the base station transmitting an ACK, the UE may request, or the base station may indicate, an increase in the MCS, no change to the MCS, no indication for the MCS (e.g., implying no change to the MCS), and/or the like. Based at least in part on the base station transmitting a NACK, the UE may request, or the base station may indicate, a decrease in MCS, no change to the MCS, and/or the like. In some aspects, the UE may request, or the base station may indicate, a change to the MCS with an explicit indication, a relative indication (e.g., an MCS relative to an MCS of a previous transmission), and/or the like.

In some aspects, the base station may provide the indication of the MCS via a DCI message (e.g., using one or more bits), a MAC CE, and/or the like. In some aspects, the base station may transmit the indication of the MCS in a single message (e.g., a DCI message, MAC layer signaling, and/or the like) with the indication to communicate using amplitude modulated PT-RSs. For example, a DCI message may include 2 or more bits to indicate that amplitude modulated PT-RSs are enabled and/or to indicate the MCS. The indication of the MCS may explicitly indicate the MCS, may indicate a difference between an MCS for symbols associated with amplitude modulated PT-RSs and an MCS for symbols associated with other data, and/or the like.

As shown by reference number 450, the UE and the base station may communicate using amplitude modulated PT-RSs. For example, the UE and the base station may communicate uplink transmissions and/or downlink transmissions using amplitude modulated PT-RSs. In some aspects, the amplitude modulated PT-RSs may include a PT-RS sequence that is multiplexed, via amplitude modulation, with data. For example, the amplitude modulated PT-RSs may include a PT-RS sequence indicated by phases of the amplitude modulated PT-RSs and data that is indicated by amplitudes of the amplitude modulated PT-RSs. The data carried via the amplitude modulated PT-RSs (e.g., on tones allocated for the PT-RSs) may be associated with a dedicated cyclic redundancy check and/or hybrid automatic repeat request (HARQ) feedback (e.g., HARQ acknowledgement (ACK) or HARQ negative acknowledgement (NACK), among other examples.

In some aspects, the UE may communicate (e.g., transmit and/or receive) the uplink transmission or the downlink transmission based at least in part on an assumption, based at least in part on transmitting the request for amplitude modulated PT-RSs, that the uplink transmission or the downlink transmission is to be transmitted having amplitude modulated PT-RSs. In other words, the UE may assume, without receiving additional signaling to confirm, that the base station will comply with the request to communicate using amplitude modulated PT-RSs.

In some aspects, data that is transmitted on resources associated with amplitude modulated PT-RSs may have a cyclical redundancy check (CRC) that is different from one or more CRCs associated with other data of the uplink transmission or the downlink transmission. In some aspects, a receiving device (e.g., the UE for a downlink transmission or the base station for an uplink transmission) may decode the data associated with amplitude modulated PT-RSs using convolution codes.

In some aspects, data transmitted on resources associated with the amplitude modulated PT-RSs may be associated with a dedicated ACK/NACK bit that is different from one or more ACK/NACK bits that are associated with other data communicated via the uplink transmission or the downlink transmission. In some aspects, based at least in part on reporting a NACK for the amplitude modulated PT-RSs, the base station may transmit, and the UE may receive (e.g., attempt to decode) a repetition of the amplitude modulated PT-RSs via a subsequent PT-RS resource.

As shown by reference number 455, the UE may decode (e.g., demodulate, decode, receive, and/or the like) downlink transmissions and/or encode (e.g., modulate, encode, and/or the like) uplink transmissions having amplitude modulated PT-RSs. Although described with reference to the UE, the base station may similarly decode uplink transmissions and/or encode downlink transmissions having amplitude modulated PT-RSs.

In some aspects, the UE may determine that the downlink transmission has amplitude modulated PT-RSs based at least in part on the indication to communicate with amplitude modulated PT-RSs, the request to communicate with amplitude modulated PT-RSs, the indication of the capability to communicate with amplitude modulated PT-RSs, determining that the PT-RSs are amplitude modulated based at least in part on variations of amplitudes of resources associated with PT-RSs of the downlink transmission, and/or the like. In some aspects, the UE may estimate a CPE based at least in part on the amplitude modulated PT-RSs. In some aspects, the UE may attempt (e.g., after estimating the CPE) to extract data from the amplitude modulated PT-RSs.

In some aspects, the UE may remove a known PT-RS sequence, based at least in part on phases of the amplitude modulated PT-RSs, from a portion of the downlink transmission received on resources allocated to the amplitude modulated PT-RSs. The UE may correct a channel effect for the portion of the downlink transmission based at least in part on, for example, DMRSs. The UE may perform antenna combining and signal equalization for the portion of the downlink transmission and then perform soft metric extraction to extract data that is indicated by amplitudes of the amplitude modulated PT-RSs.

In some aspects, the UE may remove a known PT-RS sequence, based at least in part on phases of the amplitude modulated PT-RSs, from the portion of the downlink transmission. The UE may correct the channel effect for the portion of the downlink transmission based at least in part on, for example, DMRSs. The UE may aggregate the portion of the downlink transmission received on the resources allocated to the amplitude modulated PT-RSs to represent an equivalent phasor and use the equivalent phasor to estimate a CPE for the downlink transmission.

In some aspects, the UE may decode data that is transmitted on resources associated with the amplitude modulated PT-RSs. For example, the UE may decode the data based at least in part on a configured MCS for amplitude modulated PT-RSs, based at least in part on a configured difference of an MCS for amplitude modulated PT-RSs and an MCS for other data of uplink transmissions or downlink transmissions, and/or the like.

Based at least in part on the UE indicating the capability to communicate using amplitude modulated PT-RSs and/or the UE requesting to communicate using amplitude modulated PT-RSs, the base station and/or the UE may conserve computing, communication, and/or network resources that may otherwise have been used to schedule additional resources to compensate for using dedicated resources for PT-RSs.

As indicated above, FIG. 4 is provided as an example. Other examples may differ from what is described with respect to FIG. 4.

Figure 5:
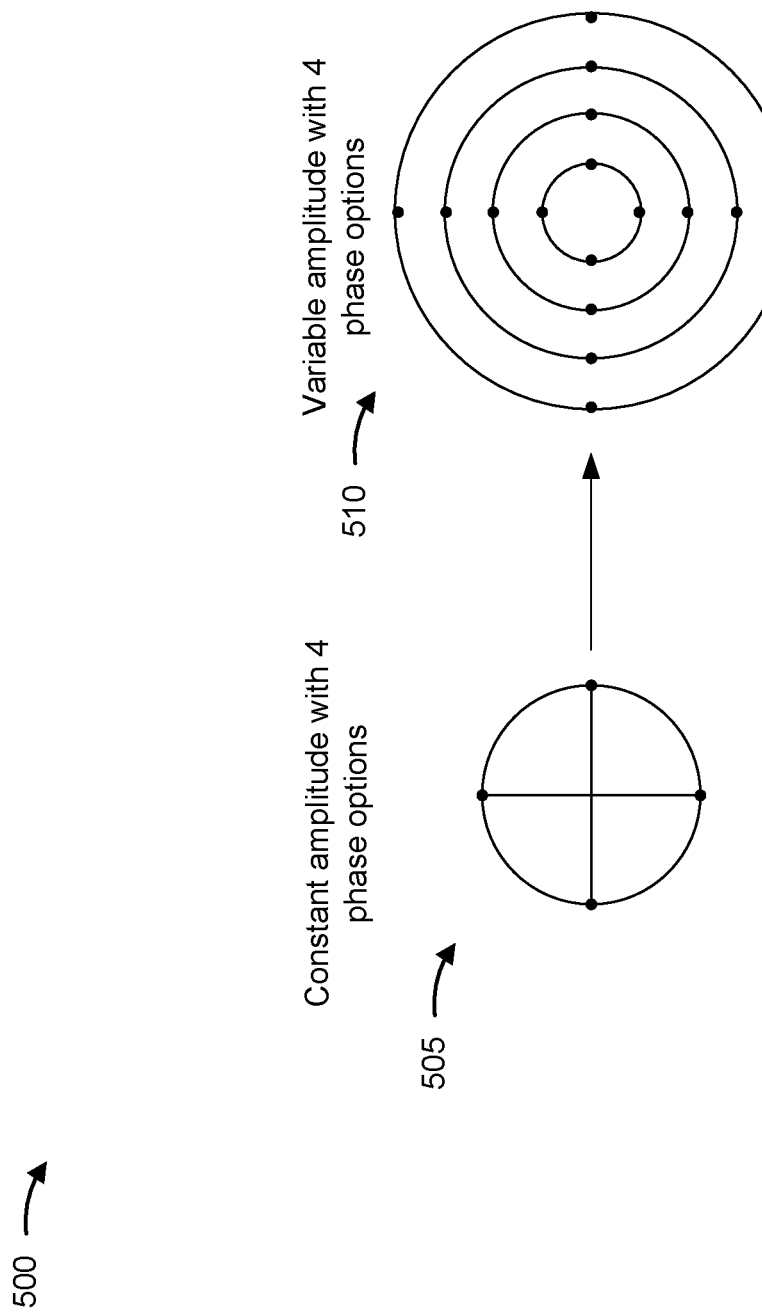
FIG. 5 is a diagram illustrating an example of amplitude modulated phase tracking reference signals, in accordance with various aspects of the present disclosure.

FIG. 5 is a diagram illustrating an example 500 of amplitude modulated PT-RSs, in accordance with various aspects of the present disclosure.

As shown in FIG. 5, and by reference number 505, a PT-RS may be transmitted with a constant amplitude with four phase options. The PT-RS with the constant amplitude may carry a Gold sequence based at least in part on phases of the PT-RS (e.g., using a sequence of the four phase options). However, the PT-RS having the constant amplitude may only carry the Gold sequence and may be a dedicated PT-RS that does not carry additional data.

As shown by reference number 510, a PT-RS may be transmitted with variable amplitude with the four phase options. In this way, the PT-RS may carry the Gold sequence via the phases of the PT-RS and may carry additional data via the amplitudes of the PT-RS.

In some aspects, a transmitting device (base station 110, UE 120, and/or the like) may modulate amplitudes of the PT-RS symbols to carry the additional data. For example, the transmitting device may configure PT-RS amplitudes using an M-amplitude shift keying (M-ASK) constellation that is based at least in part on incoming data bits to transmit. The transmitting device may configure phases of the PT-RSs based at least in part on a predefined, known Quadrature Phase Shift Keying (QPSK) symbols sequence defined for PT-RSs in a communication standard (e.g., based at least in part on configuration by a network). In some aspects, the PT-RSs may be transmitted using an amplitude phase shift keying (APSK) constellation having multiple rings (e.g., representing amplitudes) and four QPSK phase options on each ring.

A receiving device (e.g., UE 120, base station 110, and/or the like) may receive and process the PT-RSs (e.g., now amplitude modulated PT-RSs). The receiving the device may remove the known PT-RS sequence (e.g., by isolating phases of the PT-RSs) and DMRSs may be used to estimate and/or correct a channel effect for each PT-RS symbol. The receiving device may aggregate, for each symbol, PT-RSs to determine an equivalent phasor. Each phasor may represent a CPE per symbol that is based at least in part on, for example, phase noise. The phasors may be used to refine a common channel phase estimate per symbol. The receiving device may use antenna combining and signal equalization to determine a combined and equalized signal amplitude. The receiving device may use the combined and equalized signal amplitude to perform soft metric extraction to extract the data modulated on the amplitudes of the PT-RSs.

In this way, the determination of the equivalent phasor and/or CPE may be determined without, or with insignificant, negative effects from having amplitude modulation applied to the PT-RSs (e.g., based at least in part on the equivalent phasors on each symbol having an average amplitude that is defined by an average amplitude of the amplitude modulated PT-RSs).

As indicated above, FIG. 5 is provided as an example. Other examples may differ from what is described with respect to FIG. 5.

Figure 6:
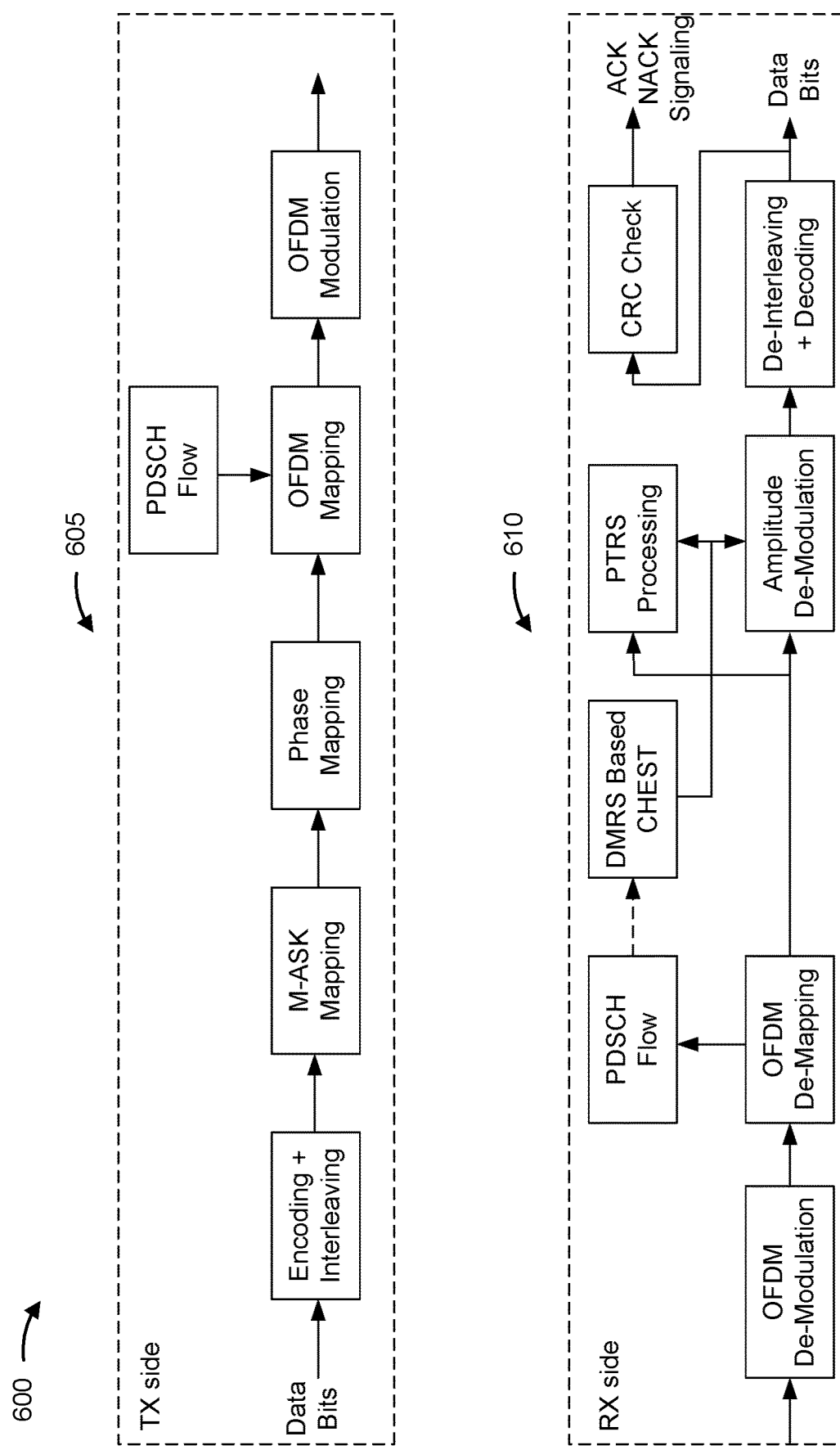
FIG. 6 is a diagram illustrating an example of amplitude modulated phase tracking reference signals, in accordance with various aspects of the present disclosure.

FIG. 6 is a diagram illustrating an example 600 of amplitude modulated PT-RSs, in accordance with various aspects of the present disclosure.

As shown in FIG. 6, and by reference number 605, a transmitting device (e.g., base station 110, UE 120, and/or the like) may receive data bits for transmission to a receiving device (e.g., UE 120, base station 110, and/or the like) via PT-RSs. The transmitting device may encode and interleave the data bits, based at least in part on an MCS for the PT-RSs, for transmission via a resource (time symbol l and frequency k) allocated to the PT-RSs. The transmitting device may perform M-ASK mapping to map the data bits to amplitudes of the PT-RSs (e.g., for transmission as a signal having a constant phase (e.g., a phase of zero)). The transmitting device may perform phase mapping to apply, to the signal, a known pilot phase defined by a PT-RS sequence (e.g., as indicated in a communication standard).

The transmitting device may perform OFDM mapping to map the signal and additional data (e.g., PDSCH flow) to OFDM symbols in resources allocated for the transmission. The transmitting device may apply OFDM modulation, based at least in part on an MCS for the PT-RSs and/or an MCS for the additional data, to modulate the PT-RSs and the additional data for transmission to the receiving device.

As shown by reference number 610, the receiving device may perform OFDM de-modulation to demodulate the signal based at least in part on, for example, the MCS for the PT-RSs and/or the MCS for the additional data. The receiving device may perform OFDM de-mapping to de-map the signal and separate signals transmitted via the PT-RS symbols from the signals transmitted via symbols of the additional data. The additional data (PDSCH flow) may be used to determine a DMRS based channel estimation. The DMRS based channel estimation may be used for PT-RS processing and/or amplitude demodulation of the PT-RS.

The receiving device may determine a phasor for each time signal (e.g., and for each antenna within a time symbol) that can be used to determine a channel phase error. The receiving device may use the channel phase error to refine a channel estimation (e.g., the DMRS based channel estimation) for decoding the additional data.

The receiving device may de-interleave and decode the signal (e.g., the signals transmitted via the PT-RS symbols and the signals transmitted via symbols of the additional data). The receiving device may use the data bits (e.g., for an application of the receiver, to generate another data packet for forwarding, and/or the like). The receiving device may perform a CRC check for the signals transmitted via the PT-RS symbols and another CRC check for the signals transmitted via symbols of the additional data. The receiving device may transmit an ACK/NACK for the signals transmitted via the PT-RS symbols and an ACK/NACK for the signals transmitted via symbols of the additional data.

As indicated above, FIG. 6 is provided as an example. Other examples may differ from what is described with respect to FIG. 6.

Figure 7:
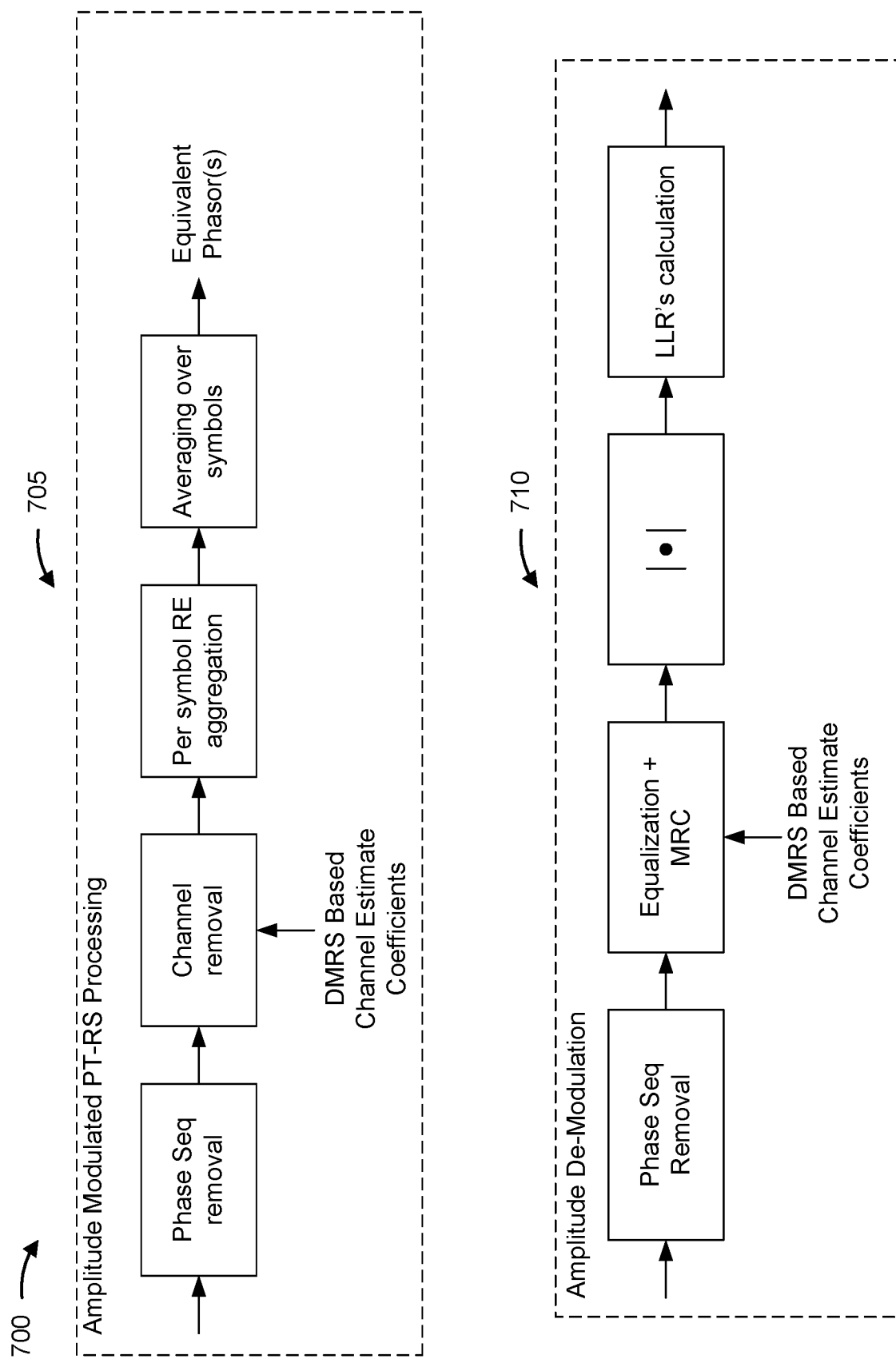
FIG. 7 is a diagram illustrating an example of receiving a transmission with amplitude modulated phase tracking reference signals, in accordance with various aspects of the present disclosure.

FIG. 7 is a diagram illustrating an example 700 of receiving a transmission with amplitude modulated PT-RSs. In some aspects, the amplitude modulated PT-RS processing may be performed by a receiving device (e.g., as shown in FIG. 6).

As shown in FIG. 7, and by reference number 705, the receiving device may perform phase sequence removal on a PT-RS signal. The receiving device may perform channel removal (e.g., channel correction) on the PT-RS signal based at least in part on DMRS based channel estimate coefficients. The receiving device may perform an aggregation of PT-RS signals (e.g., having channel correction applied) of one or more (e.g., all) PT-RS resources per symbol. The receiving device may average the aggregated PT-RS signals over one or more resource elements of a symbol to determine an equivalent phasor for the symbol. The receiving device may use averages of the aggregated PT-RS signals for multiple symbols to determine multiple equivalent phasors for the PT-RSs symbols of the multiple symbols.

In this way, the receiving device may estimate phase noise, residual frequency offset, and/or the like based at least in part on the data modulated PT-RSs. The receiving device may use estimated phase differences to determine phase noise and/or to address residual frequency offset (e.g., between symbols) prior to demodulating and/or decoding additional data transmitted with the data modulated PT-RSs.

As shown by reference number 710, the receiving device may perform amplitude de-modulation on PT-RS signals. The receiving device may remove a known phase sequence from the amplitude modulated PT-RS signals. This may isolate amplitude components of the PT-RS signals. The receiving device may perform equalization and maximal ratio combining (MRC) based at least in part on the DMRS based channel estimate coefficients. The receiving device may determine amplitudes of the PT-RS signals (e.g., based at least in part on magnitudes of the signals). The receiving device may perform a log-likelihood ratio (LLR) calculation to determine values of the amplitudes of the PT-RS signals for de-interleaving and decoding.

As indicated above, FIG. 7 is provided as an example. Other examples may differ from what is described with respect to FIG. 7.

Figure 8:
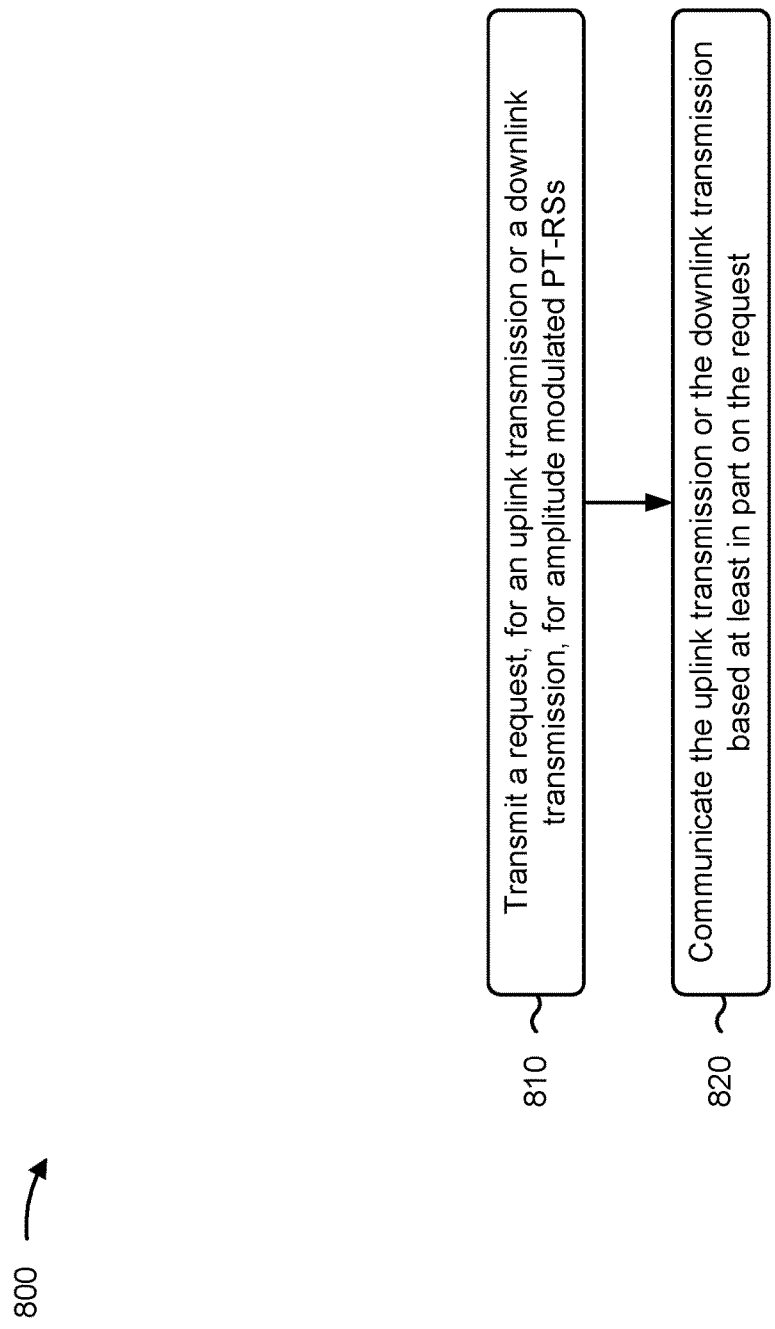
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with amplitude modulated PT-RSs.

As shown in FIG. 8, in some aspects, process 800 may include transmitting a request, for an uplink transmission or a downlink transmission, for amplitude modulated PT-RSs (block 810). For example, the UE (e.g., using transmit processor 264, controller/processor 280, memory 282, and/or the like) may transmit a request, for an uplink transmission or a downlink transmission, for amplitude modulated PT-RSs, as described above.

As further shown in FIG. 8, in some aspects, process 800 may include communicating the uplink transmission or the downlink transmission based at least in part on the request (block 820). For example, the UE (e.g., using receive processor 258, transmit processor 264, controller/processor 280, memory 282, and/or the like) may communicate the uplink transmission or the downlink transmission based at least in part on the request, as described above.

Process 800 may include additional aspects, such as any single aspect or any combination of aspects described below and/or in connection with one or more other processes described elsewhere herein.

In a first aspect, the amplitude modulated PT-RSs include a PT-RS sequence indicated by phases of the amplitude modulated PT-RSs, and data that is indicated by amplitudes of the amplitude modulated PT-RSs.

In a second aspect, alone or in combination with the first aspect, communicating the downlink transmission includes receiving the downlink transmission, and receiving the downlink transmission includes removing a known PT-RS sequence, based at least in part on phases of the amplitude modulated PT-RSs, from a portion of the downlink transmission received on resources allocated to the amplitude modulated PT-RSs; correcting a channel effect for the portion of the downlink transmission received on the resources allocated to the amplitude modulated PT-RSs; performing antenna combining and signal equalization for the portion of the downlink transmission received on the resources allocated to the amplitude modulated PT-RSs, and performing soft metric extraction, on the portion of the downlink transmission received on the resources allocated to the amplitude modulated PT-RSs, to extract data that is indicated by amplitudes of the amplitude modulated PT-RSs.

In a third aspect, alone or in combination with one or more of the first and second aspects, correcting a channel effect for the portion of the downlink transmission received on the resources allocated to the amplitude modulated PT-RSs includes correcting the channel effect based at least in part on DMRSs.

In a fourth aspect, alone or in combination with one or more of the first through third aspects, communicating the downlink transmission includes receiving the downlink transmission, and receiving the downlink transmission includes removing a known PT-RS sequence, based at least in part on phases of the amplitude modulated PT-RSs, from a portion of the downlink transmission received on resources allocated to the amplitude modulated PT-RSs; correcting a channel effect for the portion of the downlink transmission received on the resources allocated to the amplitude modulated PT-RSs; aggregating the portion of the downlink transmission received on the resources allocated to the amplitude modulated PT-RSs to represent an equivalent phasor; and using the equivalent phasor to estimate a CPE for the downlink transmission.

In a fifth aspect, alone or in combination with one or more of the first through fourth aspects, correcting a channel effect for the portion of the downlink transmission received on the resources allocated to the amplitude modulated PT-RSs includes correcting the channel effect based at least in part on DMRSs.

In a sixth aspect, alone or in combination with one or more of the first through fifth aspects, data that is transmitted on resources associated with amplitude modulated PT-RSs have a CRC that is different from one or more CRCs associated with other data of the uplink transmission or the downlink transmission.

In a seventh aspect, alone or in combination with one or more of the first through sixth aspects, data transmitted on resources associated with the amplitude modulated PT-RSs is associated with a dedicated ACK/NACK bit that is different from one or more ACK/NACK bits that are associated with other data communicated via the uplink transmission or the downlink transmission.

In an eighth aspect, alone or in combination with one or more of the first through seventh aspects, process 800 includes reporting a NACK for the amplitude modulated PT-RSs and receiving a repetition of the amplitude modulated PT-RSs via a subsequent PT-RS resource.

In a ninth aspect, alone or in combination with one or more of the first through eighth aspects, process 800 includes transmitting a request for an MCS for symbols associated with the amplitude modulated PT-RSs.

In a tenth aspect, alone or in combination with one or more of the first through ninth aspects, transmitting the request for the MCS includes transmitting the request for the MCS with the request for amplitude modulated PT-RSs.

In an eleventh aspect, alone or in combination with one or more of the first through tenth aspects, process 800 includes receiving an indication of an MCS for symbols associated with the amplitude modulated PT-RSs.

In a twelfth aspect, alone or in combination with one or more of the first through eleventh aspects, the indication of the MCS is based at least in part on feedback signaling associated with a previous downlink transmission having amplitude modulated PT-RSs.

In a thirteenth aspect, alone or in combination with one or more of the first through twelfth aspects, receiving the indication of the MCS includes receiving the indication of the MCS via DCI, RRC signaling, or one or more MAC CEs.

In a fourteenth aspect, alone or in combination with one or more of the first through thirteenth aspects, the indication of the MCS indicates a difference between the MCS for symbols associated with the amplitude modulated PT-RSs and an MCS for symbols associated with other data of the uplink transmission or the downlink transmission.

In a fifteenth aspect, alone or in combination with one or more of the first through fourteenth aspects, process 800 includes decoding data that is multiplexed with a PT-RS sequence on resources associated with the amplitude modulated PT-RSs based at least in part on a configured MCS for amplitude modulated PT-RSs of downlink transmissions or a configured difference of an MCS for amplitude modulated PT-RSs and an MCS for other data of downlink transmissions.

In a sixteenth aspect, alone or in combination with one or more of the first through fifteenth aspects, process 800 includes transmitting an indication of a capability of the UE to communicate one or more of uplink transmissions or downlink transmissions with amplitude modulated PT-RSs.

In a seventeenth aspect, alone or in combination with one or more of the first through sixteenth aspects, transmitting the indication of the capability of the UE includes transmitting the indication via one or more of RRC signaling, a MAC CE, or a PUCCH message.

In an eighteenth aspect, alone or in combination with one or more of the first through seventeenth aspects, process 800 includes receiving configuration information that indicates that a base station is to provide an indication of whether amplitude modulated PT-RSs are enabled.

In a nineteenth aspect, alone or in combination with one or more of the first through eighteenth aspects, process 800 includes receiving an indication to communicate based at least in part on amplitude modulated PT-RSs.

In a twentieth aspect, alone or in combination with one or more of the first through nineteenth aspects, receiving the indication includes receiving the indication via one or more of a DCI message, a MAC CE, or RRC signaling.

In a twenty-first aspect, alone or in combination with one or more of the first through twentieth aspects, process 800 includes communicating the uplink transmission or the downlink transmission based at least in part on an assumption, based at least in part on transmitting the request, that the uplink transmission or the downlink transmission is to be transmitted with amplitude modulated PT-RSs.

In a twenty-second aspect, alone or in combination with one or more of the first through twenty-first aspects, process 800 includes receiving the downlink transmission; determining, based at least in part on variations of amplitudes of resources associated with PT-RSs of the downlink transmission, that the downlink transmission has amplitude modulated PT-RSs; estimating, based at least in part on the amplitude modulated PT-RSs, a CPE for the downlink transmission; and attempting to extract data from the amplitude modulated PT-RSs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
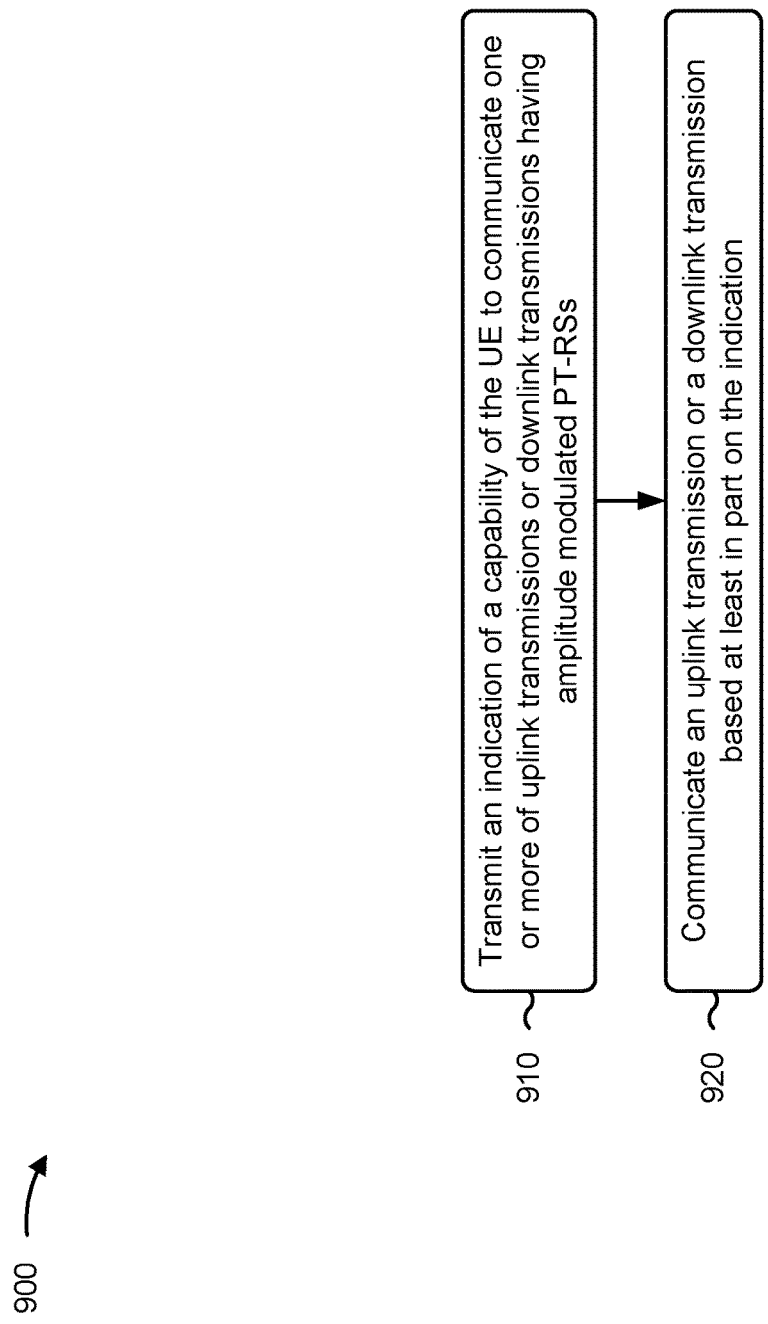
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with amplitude modulated PT-RSs.

As shown in FIG. 9, in some aspects, process 900 may include transmitting an indication of a capability of the UE to communicate one or more of uplink transmissions or downlink transmissions having amplitude modulated PT-RSs (block 910). For example, the UE (e.g., using transmit processor 264, controller/processor 280, memory 282, and/or the like) may transmit an indication of a capability of the UE to communicate one or more of uplink transmissions or downlink transmissions having amplitude modulated PT-RSs, as described above.

As further shown in FIG. 9, in some aspects, process 900 may include communicating an uplink transmission or a downlink transmission based at least in part on the indication (block 920). For example, the UE (e.g., using receive processor 258, transmit processor 264, controller/processor 280, memory 282, and/or the like) may communicate an uplink transmission or a downlink transmission based at least in part on the indication, as described above.

Process 900 may include additional aspects, such as any single aspect or any combination of aspects described below and/or in connection with one or more other processes described elsewhere herein.

In a first aspect, transmitting the indication of the capability of the UE includes transmitting the indication via one or more of RRC signaling, a MAC CE, or a PUCCH message.

In a second aspect, alone or in combination with the first aspect, process 900 includes transmitting a request, for an uplink transmission or a downlink transmission, for amplitude modulated PT-RSs.

In a third aspect, alone or in combination with one or more of the first and second aspects, the amplitude modulated PT-RSs include a PT-RS sequence indicated by phases of the amplitude modulated PT-RSs, and data that is indicated by amplitudes of the amplitude modulated PT-RSs.

In a fourth aspect, alone or in combination with one or more of the first through third aspects, communicating the downlink transmission includes receiving the downlink transmission, and receiving the downlink transmission includes removing a known PT-RS sequence, based at least in part on phases of the amplitude modulated PT-RSs, from a portion of the downlink transmission received on resources allocated to the amplitude modulated PT-RSs; correcting a channel effect for the portion of the downlink transmission received on the resources allocated to the amplitude modulated PT-RSs; performing antenna combining and signal equalization for the portion of the downlink transmission received on the resources allocated to the amplitude modulated PT-RSs, and performing soft metric extraction, on the portion of the downlink transmission received on the resources allocated to the amplitude modulated PT-RSs, to extract data that is indicated by amplitudes of the amplitude modulated PT-RSs.

In a fifth aspect, alone or in combination with one or more of the first through fourth aspects, correcting a channel effect for the portion of the downlink transmission received on the resources allocated to the amplitude modulated PT-RSs includes correcting the channel effect based at least in part on DMRSs.

In a sixth aspect, alone or in combination with one or more of the first through fifth aspects, communicating the downlink transmission includes receiving the downlink transmission, and receiving the downlink transmission includes removing a known PT-RS sequence, based at least in part on phases of the amplitude modulated PT-RSs, from a portion of the downlink transmission received on resources allocated to the amplitude modulated PT-RSs; correcting a channel effect for the portion of the downlink transmission received on the resources allocated to the amplitude modulated PT-RSs; aggregating the portion of the downlink transmission received on the resources allocated to the amplitude modulated PT-RSs to represent an equivalent phasor, and using the equivalent phasor to estimate a CPE for the downlink transmission.

In a seventh aspect, alone or in combination with one or more of the first through sixth aspects, correcting a channel effect for the portion of the downlink transmission received on the resources allocated to the amplitude modulated PT-RSs includes correcting the channel effect based at least in part on DMRSs.

In an eighth aspect, alone or in combination with one or more of the first through seventh aspects, data that is transmitted on resources associated with amplitude modulated PT-RSs have a CRC that is different from one or more CRCs associated with other data of the uplink transmission or the downlink transmission.

In a ninth aspect, alone or in combination with one or more of the first through eighth aspects, data transmitted on resources associated with the amplitude modulated PT-RSs is associated with a dedicated ACK/NACK bit that is different from one or more ACK/NACK bits that are associated with other data communicated via the uplink transmission or the downlink transmission.

In a tenth aspect, alone or in combination with one or more of the first through ninth aspects, process 900 includes reporting a NACK for the amplitude modulated PT-RSs; and receiving a repetition of the amplitude modulated PT-RSs via a subsequent PT-RS resource.

In an eleventh aspect, alone or in combination with one or more of the first through tenth aspects, process 900 includes transmitting a request for an MCS for symbols associated with the amplitude modulated PT-RSs.

In a twelfth aspect, alone or in combination with one or more of the first through eleventh aspects, transmitting the request for the MCS includes transmitting the request for the MCS with the request for amplitude modulated PT-RSs.

In a thirteenth aspect, alone or in combination with one or more of the first through twelfth aspects, process 900 includes receiving an indication of an MCS for symbols associated with the amplitude modulated PT-RSs.

In a fourteenth aspect, alone or in combination with one or more of the first through thirteenth aspects, the indication of the MCS is based at least in part on feedback signaling associated with a previous downlink transmission having amplitude modulated PT-RSs.

In a fifteenth aspect, alone or in combination with one or more of the first through fourteenth aspects, receiving the indication of the MCS includes receiving the indication of the MCS via DCI, RRC signaling, or one or more MAC CEs.

In a sixteenth aspect, alone or in combination with one or more of the first through fifteenth aspects, the indication of the MCS indicates a difference between the MCS for symbols associated with the amplitude modulated PT-RSs and an MCS for symbols associated with other data of the uplink transmission or the downlink transmission.

In a seventeenth aspect, alone or in combination with one or more of the first through sixteenth aspects, process 900 includes decoding data that is multiplexed with a PT-RS sequence on resources associated with the amplitude modulated PT-RSs based at least in part on a configured MCS for amplitude modulated PT-RSs of downlink transmissions or a configured difference of an MCS for amplitude modulated PT-RSs and an MCS for other data of downlink transmissions.

In an eighteenth aspect, alone or in combination with one or more of the first through seventeenth aspects, process 900 includes receiving configuration information that indicates that a base station is to provide an indication of whether amplitude modulated PT-RSs is enabled.

In a nineteenth aspect, alone or in combination with one or more of the first through eighteenth aspects, process 900 includes receiving an indication to communicate based at least in part on amplitude modulated PT-RSs.

In a twentieth aspect, alone or in combination with one or more of the first through nineteenth aspects, receiving the indication includes receiving the indication via one or more of a DCI message, a MAC CE, or RRC signaling.

In a twenty-first aspect, alone or in combination with one or more of the first through twentieth aspects, process 900 includes communicating the uplink transmission or the downlink transmission based at least in part on an assumption, based at least in part on transmitting the request, that the uplink transmission or the downlink transmission is to be transmitted with amplitude modulated PT-RSs.

In a twenty-second aspect, alone or in combination with one or more of the first through twenty-first aspects, process 900 includes receiving the downlink transmission; determining, based at least in part on variations of amplitudes of resources associated with PT-RSs of the downlink transmission, that the downlink transmission has amplitude modulated PT-RSs; estimating, based at least in part on the amplitude modulated PT-RSs, a CPE for the downlink transmission; and attempting to extract data from the amplitude modulated PT-RSs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
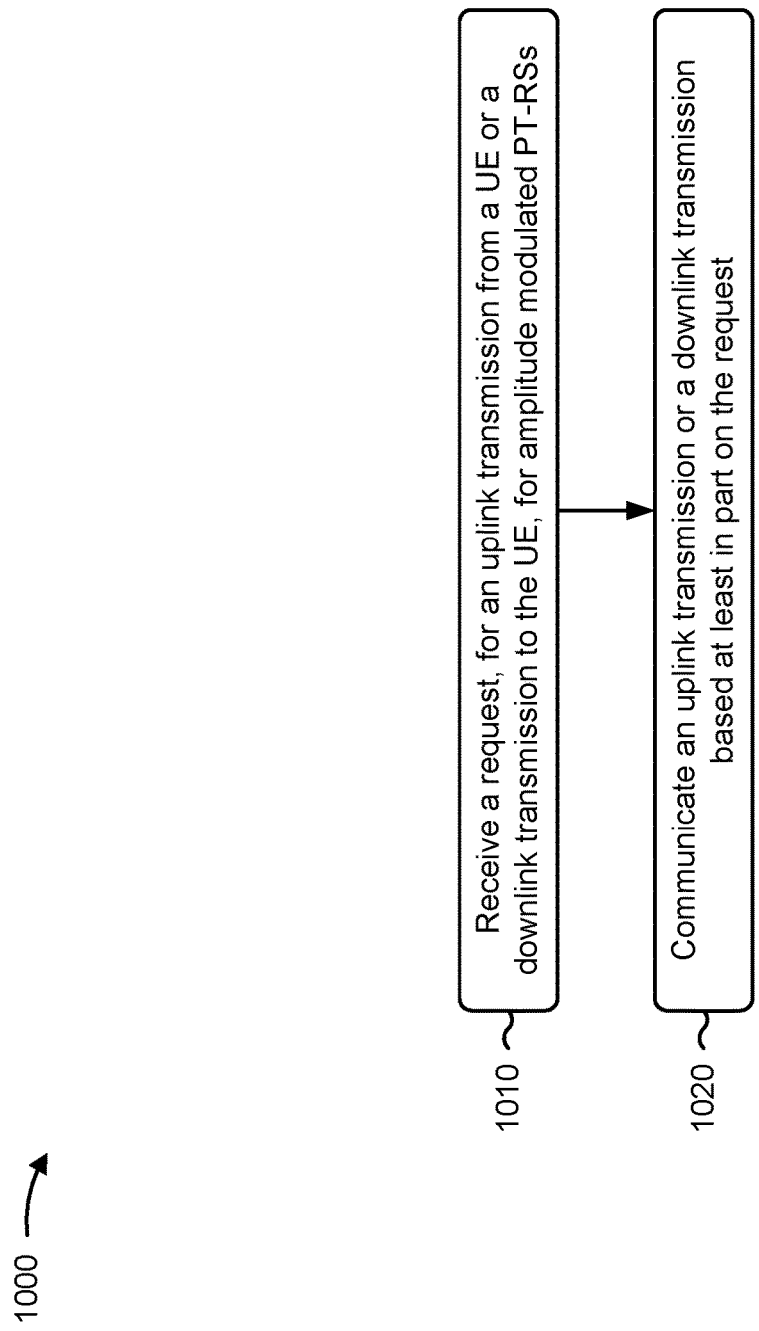
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., base station 110 and/or the like) performs operations associated with amplitude modulated PT-RSs.

As shown in FIG. 10, in some aspects, process 1000 may include receiving a request, for an uplink transmission from a UE or a downlink transmission to the UE, for amplitude modulated PT-RSs (block 1010). For example, the base station (e.g., using receive processor 238, controller/processor 240, memory 242, and/or the like) may receive a request, for an uplink transmission from a UE or a downlink transmission to the UE, for amplitude modulated PT-RSs, as described above.

As further shown in FIG. 10, in some aspects, process 1000 may include communicating an uplink transmission or a downlink transmission based at least in part on the request (block 1020). For example, the base station (e.g., using transmit processor 220, receive processor 238, controller/processor 240, memory 242, and/or the like) may communicate an uplink transmission or a downlink transmission based at least in part on the request, as described above.

Process 1000 may include additional aspects, such as any single aspect or any combination of aspects described below and/or in connection with one or more other processes described elsewhere herein.

In a first aspect, process 1000 includes determining whether to transmit the downlink transmission with amplitude modulated PT-RSs based at least in part on one or more of an amount of data buffered for the downlink transmission, a size of a resource grant associated with the downlink transmission, an RSRP associated with the UE, or movement of the UE.

In a second aspect, alone or in combination with the first aspect, the amplitude modulated PT-RSs include a PT-RS sequence indicated by phases of the amplitude modulated PT-RSs, and data that is indicated by amplitudes of the amplitude modulated PT-RSs.

In a third aspect, alone or in combination with one or more of the first and second aspects, communicating the uplink transmission includes receiving the uplink transmission, and receiving the uplink transmission includes removing a known PT-RS sequence, based at least in part on phases of the amplitude modulated PT-RSs, from a portion of the uplink transmission received on resources allocated to the amplitude modulated PT-RSs; correcting a channel effect for the portion of the uplink transmission received on the resources allocated to the amplitude modulated PT-RSs; performing antenna combining and signal equalization for the portion of the uplink transmission received on the resources allocated to the amplitude modulated PT-RSs, and performing soft metric extraction, on the portion of the uplink transmission received on the resources allocated to the amplitude modulated PT-RSs, to extract data that is indicated by amplitudes of the amplitude modulated PT-RSs.

In a fourth aspect, alone or in combination with one or more of the first through third aspects, correcting a channel effect for the portion of the uplink transmission received on the resources allocated to the amplitude modulated PT-RSs includes correcting the channel effect based at least in part on DMRSs.

In a fifth aspect, alone or in combination with one or more of the first through fourth aspects, communicating the uplink transmission includes receiving the uplink transmission, and receiving the uplink transmission includes removing a known PT-RS sequence, based at least in part on phases of the amplitude modulated PT-RSs, from a portion of the uplink transmission received on resources allocated to the amplitude modulated PT-RSs; correcting a channel effect for the portion of the uplink transmission received on the resources allocated to the amplitude modulated PT-RSs; aggregating the portion of the uplink transmission received on the resources allocated to the amplitude modulated PT-RSs to represent an equivalent phasor, and using the equivalent phasor to estimate a CPE for the uplink transmission.

In a sixth aspect, alone or in combination with one or more of the first through fifth aspects, correcting a channel effect for the portion of the uplink transmission received on the resources allocated to the amplitude modulated PT-RSs includes correcting the channel effect based at least in part on DMRSs.

In a seventh aspect, alone or in combination with one or more of the first through sixth aspects, data that is transmitted on resources associated with amplitude modulated PT-RSs have a CRC that is different from one or more CRCs associated with other data of the uplink transmission or the downlink transmission.

In an eighth aspect, alone or in combination with one or more of the first through seventh aspects, data transmitted on resources associated with the amplitude modulated PT-RSs is associated with a dedicated ACK/NACK bit that is different from one or more ACK/NACK bits that are associated with other data communicated via the uplink transmission or the downlink transmission.

In a ninth aspect, alone or in combination with one or more of the first through eighth aspects, process 1000 includes receiving a NACK for the amplitude modulated PT-RSs on the downlink transmission and transmitting a repetition of the amplitude modulated PT-RSs via a subsequent PT-RS resource.

In a tenth aspect, alone or in combination with one or more of the first through ninth aspects, process 1000 includes receiving a request for an MCS for symbols associated with the amplitude modulated PT-RSs.

In an eleventh aspect, alone or in combination with one or more of the first through tenth aspects, receiving the request for the MCS includes receiving the request for the MCS with the request for amplitude modulated PT-RSs.

In a twelfth aspect, alone or in combination with one or more of the first through eleventh aspects, process 1000 includes transmitting an indication of an MCS for symbols associated with the amplitude modulated PT-RSs.

In a thirteenth aspect, alone or in combination with one or more of the first through twelfth aspects, the indication of the MCS is based at least in part on feedback signaling associated with a previous downlink transmission having amplitude modulated PT-RSs.

In a fourteenth aspect, alone or in combination with one or more of the first through thirteenth aspects, transmitting the indication of the MCS includes transmitting the indication of the MCS via DCI, RRC signaling, or one or more MAC CEs.

In a fifteenth aspect, alone or in combination with one or more of the first through fourteenth aspects, the indication of the MCS indicates a difference between the MCS for symbols associated with the amplitude modulated PT-RSs and an MCS for symbols associated with other data of the uplink transmission or the downlink transmission.

In a sixteenth aspect, alone or in combination with one or more of the first through fifteenth aspects, process 1000 includes decoding data that is multiplexed with a PT-RS sequence on resources associated with the amplitude modulated PT-RSs based at least in part on a configured MCS for amplitude modulated PT-RSs of uplink transmissions or a configured difference of an MCS for amplitude modulated PT-RSs and an MCS for other data of uplink transmissions.

In a seventeenth aspect, alone or in combination with one or more of the first through sixteenth aspects, process 1000 includes receiving an indication of a capability of the UE to communicate one or more of uplink transmissions or downlink transmissions with amplitude modulated PT-RSs.

In an eighteenth aspect, alone or in combination with one or more of the first through seventeenth aspects, receiving the indication of the capability of the UE includes receiving the indication via one or more of RRC signaling, a MAC CE, or a PUCCH message.

In a nineteenth aspect, alone or in combination with one or more of the first through eighteenth aspects, process 1000 includes transmitting configuration information that indicates that the base station is to provide an indication of whether amplitude modulated PT-RSs is enabled.

In a twentieth aspect, alone or in combination with one or more of the first through nineteenth aspects, process 1000 includes transmitting an indication to communicate based at least in part on amplitude modulated PT-RSs.

In a twenty-first aspect, alone or in combination with one or more of the first through twentieth aspects, transmitting the indication includes transmitting the indication via one or more of a DCI message, a MAC CE, or RRC signaling.

In a twenty-second aspect, alone or in combination with one or more of the first through twenty-first aspects, process 1000 includes receiving the uplink transmission; determining, based at least in part on variations of amplitudes of resources associated with PT-RSs of the uplink transmission, that the uplink transmission has amplitude modulated PT-RSs; estimating, based at least in part on the amplitude modulated PT-RSs, a CPE for the uplink transmission; and attempting to extract data from the amplitude modulated PT-RSs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
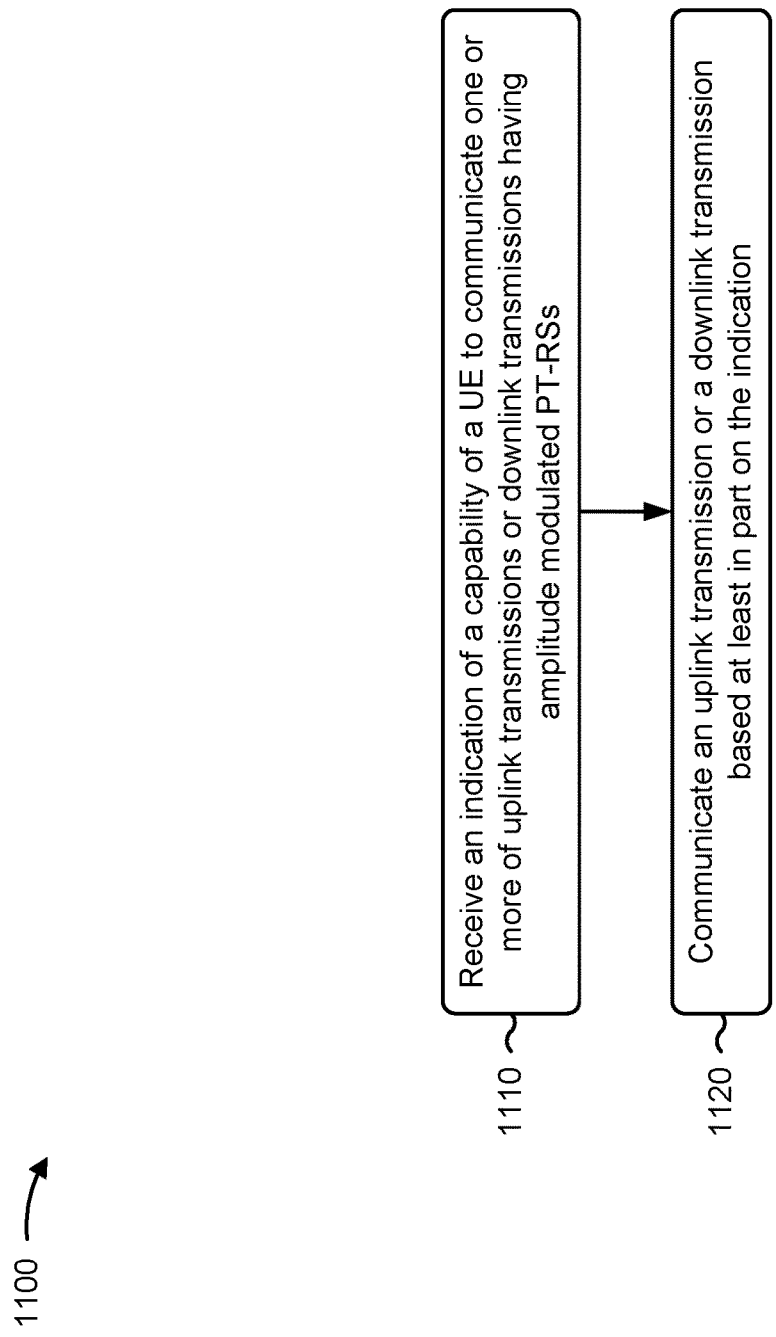
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where the base station (e.g., base station 110 and/or the like) performs operations associated with amplitude modulated PT-RSs.

As shown in FIG. 11, in some aspects, process 1100 may include receiving an indication of a capability of a UE to communicate one or more of uplink transmissions or downlink transmissions having amplitude modulated PT-RSs (block 1110). For example, the base station (e.g., using receive processor 238, controller/processor 240, memory 242, and/or the like) may receive an indication of a capability of a UE to communicate one or more of uplink transmissions or downlink transmissions having amplitude modulated PT-RSs, as described above.

As further shown in FIG. 11, in some aspects, process 1100 may include communicating an uplink transmission or a downlink transmission based at least in part on the indication (block 1120). For example, the base station (e.g., using transmit processor 220, receive processor 238, controller/processor 240, memory 242, and/or the like) may communicate an uplink transmission or a downlink transmission based at least in part on the indication, as described above.

Process 1100 may include additional aspects, such as any single aspect or any combination of aspects described below and/or in connection with one or more other processes described elsewhere herein.

In a first aspect, process 1100 includes determining whether to transmit the downlink transmission with amplitude modulated PT-RSs based at least in part on one or more of an amount of data buffered for the downlink transmission, a size of a resource grant associated with the downlink transmission, an RSRP associated with the UE, or movement of the UE.

In a second aspect, alone or in combination with the first aspect, receiving the indication of the capability of the UE includes receiving the indication via one or more of RRC signaling, a MAC CE, or a PUCCH message.

In a third aspect, alone or in combination with one or more of the first and second aspects, process 1100 includes receiving a request, for the uplink transmission or the downlink transmission, for amplitude modulated PT-RSs.

In a fourth aspect, alone or in combination with one or more of the first through third aspects, the amplitude modulated PT-RSs include a PT-RS sequence indicated by phases of the amplitude modulated PT-RSs, and data that is indicated by amplitudes of the amplitude modulated PT-RSs.

In a fifth aspect, alone or in combination with one or more of the first through fourth aspects, communicating the uplink transmission includes receiving the uplink transmission, and receiving the uplink transmission includes removing a known PT-RS sequence, based at least in part on phases of the amplitude modulated PT-RSs, from a portion of the uplink transmission received on resources allocated to the amplitude modulated PT-RSs; correcting a channel effect for the portion of the uplink transmission received on the resources allocated to the amplitude modulated PT-RSs; performing antenna combining and signal equalization for the portion of the uplink transmission received on the resources allocated to the amplitude modulated PT-RSs, and performing soft metric extraction, on the portion of the uplink transmission received on the resources allocated to the amplitude modulated PT-RSs, to extract data that is indicated by amplitudes of the amplitude modulated PT-RSs.

In a sixth aspect, alone or in combination with one or more of the first through fifth aspects, correcting a channel effect for the portion of the uplink transmission received on the resources allocated to the amplitude modulated PT-RSs includes correcting the channel effect based at least in part on DMRSs.

In a seventh aspect, alone or in combination with one or more of the first through sixth aspects, communicating the uplink transmission includes receiving the uplink transmission, and receiving the uplink transmission includes removing a known PT-RS sequence, based at least in part on phases of the amplitude modulated PT-RSs, from a portion of the uplink transmission received on resources allocated to the amplitude modulated PT-RSs; correcting a channel effect for the portion of the uplink transmission received on the resources allocated to the amplitude modulated PT-RSs; aggregating the portion of the uplink transmission received on the resources allocated to the amplitude modulated PT-RSs to represent an equivalent phasor, and using the equivalent phasor to estimate a CPE for the uplink transmission.

In an eighth aspect, alone or in combination with one or more of the first through seventh aspects, correcting a channel effect for the portion of the uplink transmission received on the resources allocated to the amplitude modulated PT-RSs includes correcting the channel effect based at least in part on DMRSs.

In a ninth aspect, alone or in combination with one or more of the first through eighth aspects, data that is transmitted on resources associated with amplitude modulated PT-RSs have a CRC that is different from one or more CRCs associated with other data of the uplink transmission or the downlink transmission.

In a tenth aspect, alone or in combination with one or more of the first through ninth aspects, data transmitted on resources associated with the amplitude modulated PT-RSs is associated with a dedicated ACK/NACK bit that is different from one or more ACK/NACK bits that are associated with other data communicated via the uplink transmission or the downlink transmission.

In an eleventh aspect, alone or in combination with one or more of the first through tenth aspects, process 1100 includes receiving a NACK for the amplitude modulated PT-RSs on the downlink transmission; and transmitting a repetition of the amplitude modulated PT-RSs via a subsequent PT-RS resource.

In a twelfth aspect, alone or in combination with one or more of the first through eleventh aspects, process 1100 includes receiving a request for an MCS for symbols associated with the amplitude modulated PT-RSs.

In a thirteenth aspect, alone or in combination with one or more of the first through twelfth aspects, receiving the request for the MCS includes receiving the request for the MCS with the request for amplitude modulated PT-RSs.

In a fourteenth aspect, alone or in combination with one or more of the first through thirteenth aspects, process 1100 includes transmitting an indication of an MCS for symbols associated with the amplitude modulated PT-RSs.

In a fifteenth aspect, alone or in combination with one or more of the first through fourteenth aspects, the indication of the MCS is based at least in part on feedback signaling associated with a previous downlink transmission having amplitude modulated PT-RSs.

In a sixteenth aspect, alone or in combination with one or more of the first through fifteenth aspects, transmitting the indication of the MCS includes transmitting the indication of the MCS via DCI, RRC signaling, or one or more MAC CEs.

In a seventeenth aspect, alone or in combination with one or more of the first through sixteenth aspects, the indication of the MCS indicates a difference between the MCS for symbols associated with the amplitude modulated PT-RSs and an MCS for symbols associated with other data of the uplink transmission or the downlink transmission.

In an eighteenth aspect, alone or in combination with one or more of the first through seventeenth aspects, process 1100 includes decoding data that is multiplexed with a PT-RS sequence on resources associated with the amplitude modulated PT-RSs based at least in part on a configured MCS for amplitude modulated PT-RSs of uplink transmissions or a configured difference of an MCS for amplitude modulated PT-RSs and an MCS for other data of uplink transmissions.

In a nineteenth aspect, alone or in combination with one or more of the first through eighteenth aspects, process 1100 includes transmitting configuration information that indicates that the base station is to provide an indication of whether amplitude modulated PT-RSs is enabled.

In a twentieth aspect, alone or in combination with one or more of the first through nineteenth aspects, process 1100 includes transmitting an indication to communicate based at least in part on amplitude modulated PT-RSs.

In a twenty-first aspect, alone or in combination with one or more of the first through twentieth aspects, transmitting the indication includes transmitting the indication via one or more of a DCI message, a MAC CE, or RRC signaling.

In a twenty-second aspect, alone or in combination with one or more of the first through twenty-first aspects, process 1100 includes receiving the uplink transmission; determining, based at least in part on variations of amplitudes of resources associated with PT-RSs of the uplink transmission, that the uplink transmission has amplitude modulated PT-RSs; estimating, based at least in part on the amplitude modulated PT-RSs, a CPE for the uplink transmission; and attempting to extract data from the amplitude modulated PT-RSs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
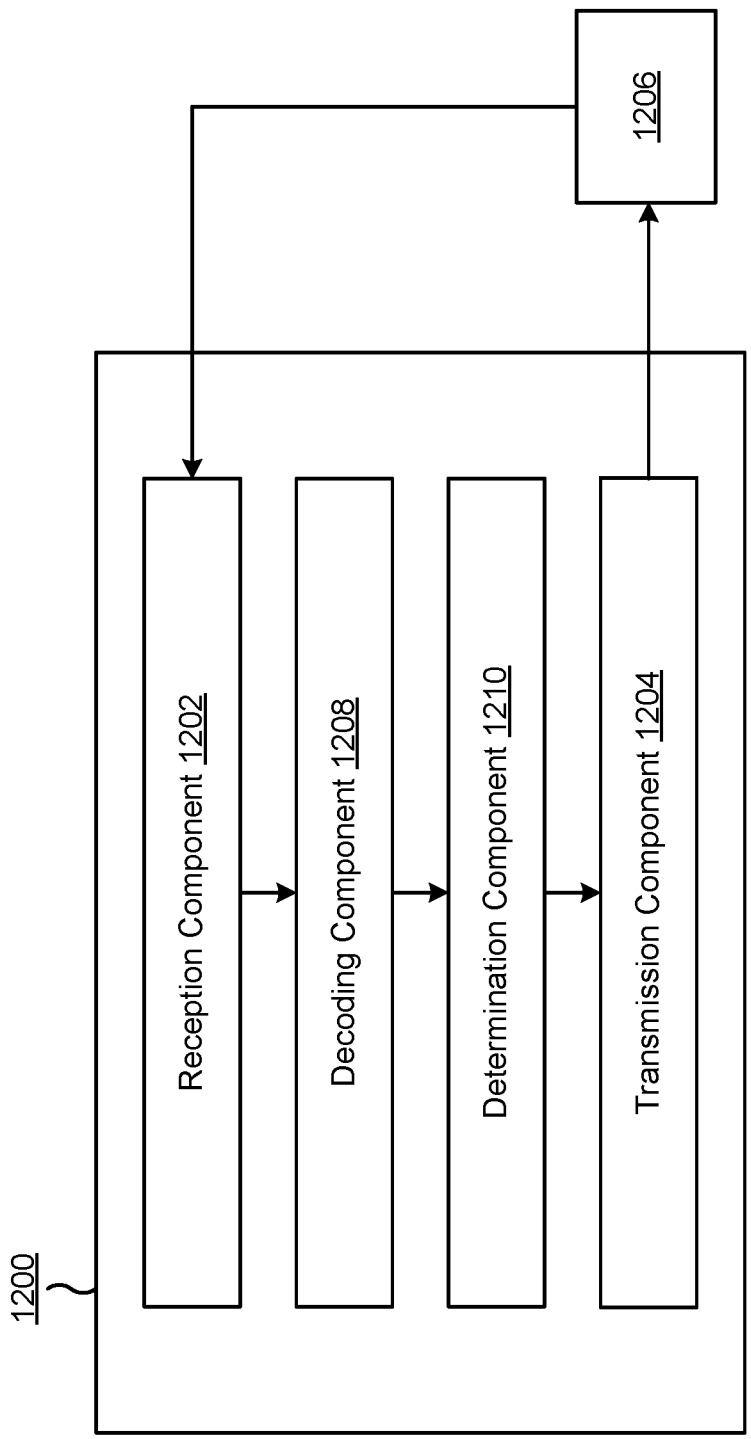
FIGS. 12 and 13 are block diagrams of example apparatuses for wireless communication, in accordance with various aspects of the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a decoding component 1208, or a determination component 1210, among other examples.

In some aspects, the apparatus 1200 may be configured to perform one or more operations described herein in connection with FIGS. 4-7. Additionally, or alternatively, the apparatus 1200 may be configured to perform one or more processes described herein, such as process 800 of FIG. 8, process 900 of FIG. 9, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be collocated with the reception component 1202 in a transceiver.

The transmission component 1204 may transmit a request, for an uplink transmission or a downlink transmission, for amplitude modulated PT-RSs. The transmission component 1204 and/or the reception component 1202 may communicate the uplink transmission or the downlink transmission based at least in part on the request. In some aspects, the transmission component 1204 and/or the reception component 1202 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 1204 may report a NACK for the amplitude modulated PT-RSs.

The reception component 1202 may receive a repetition of the amplitude modulated PT-RSs via a subsequent PT-RS resource.

The transmission component 1204 may transmit a request for a modulation and coding scheme for symbols associated with the amplitude modulated PT-RSs.

The reception component 1202 may receive an indication of a modulation and coding scheme for symbols associated with the amplitude modulated PT-RSs.

The transmission component 1204 may transmit an indication of a capability of the UE to communicate one or more of uplink transmissions or downlink transmissions with amplitude modulated PT-RSs.

The reception component 1202 may receive configuration information that indicates that a base station is to provide an indication of whether amplitude modulated PT-RSs are enabled.

The reception component 1202 may receive an indication to communicate based at least in part on amplitude modulated PT-RSs.

The transmission component 1204 and/or the reception component 1202 may communicate the uplink transmission or the downlink transmission based at least in part on an assumption, based at least in part on transmitting the request, that the uplink transmission or the downlink transmission is to be transmitted with amplitude modulated PT-RSs.

The reception component 1202 may receive the downlink transmission.

The determination component 1210 may determine, based at least in part on variations of amplitudes of resources associated with PT-RSs of the downlink transmission, that the downlink transmission has amplitude modulated PT-RSs. In some aspects, the determination component 1210 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reception component 1202 may estimate, based at least in part on the amplitude modulated PT-RSs, a common phase error for the downlink transmission.

The decoding component 1208 and/or the reception component 1202 may attempt to extract data from the amplitude modulated PT-RSs. In some aspects, the decoding component 1208 may include a demodulator, a MIMO detector, a receive processor, a controller/processor, a memory, or a combination thereof, of the UE described above in connection with FIG. 2.

The transmission component 1204 may transmit an indication of a capability of the UE to communicate one or more of uplink transmissions or downlink transmissions having amplitude modulated PT-RSs. The transmission component 1204 and/or the reception component 1202 may communicate an uplink transmission or a downlink transmission based at least in part on the indication.

The transmission component 1204 may transmit a request, for an uplink transmission or a downlink transmission, for amplitude modulated PT-RSs.

The transmission component 1204 may report a NACK for the amplitude modulated PT-RSs.

The reception component 1202 may receive a repetition of the amplitude modulated PT-RSs via a subsequent PT-RS resource.

The transmission component 1204 may transmit a request for a modulation and coding scheme for symbols associated with the amplitude modulated PT-RSs.

The reception component 1202 may receive an indication of a modulation and coding scheme for symbols associated with the amplitude modulated PT-RSs.

The reception component 1202 may receive configuration information that indicates that a base station is to provide an indication of whether amplitude modulated PT-RSs is enabled.

The reception component 1202 may receive an indication to communicate based at least in part on amplitude modulated PT-RSs.

The transmission component 1204 and/or the reception component 1202 may communicate the uplink transmission or the downlink transmission based at least in part on an assumption, based at least in part on transmitting the request, that the uplink transmission or the downlink transmission is to be transmitted with amplitude modulated PT-RSs.

The reception component 1202 may receive the downlink transmission.

The determination component 1210 may determine, based at least in part on variations of amplitudes of resources associated with PT-RSs of the downlink transmission, that the downlink transmission has amplitude modulated PT-RSs.

The reception component 1202 may estimate, based at least in part on the amplitude modulated PT-RSs, a common phase error for the downlink transmission.

The reception component 1202 and/or the decoding component 1208 may attempt to extract data from the amplitude modulated PT-RSs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
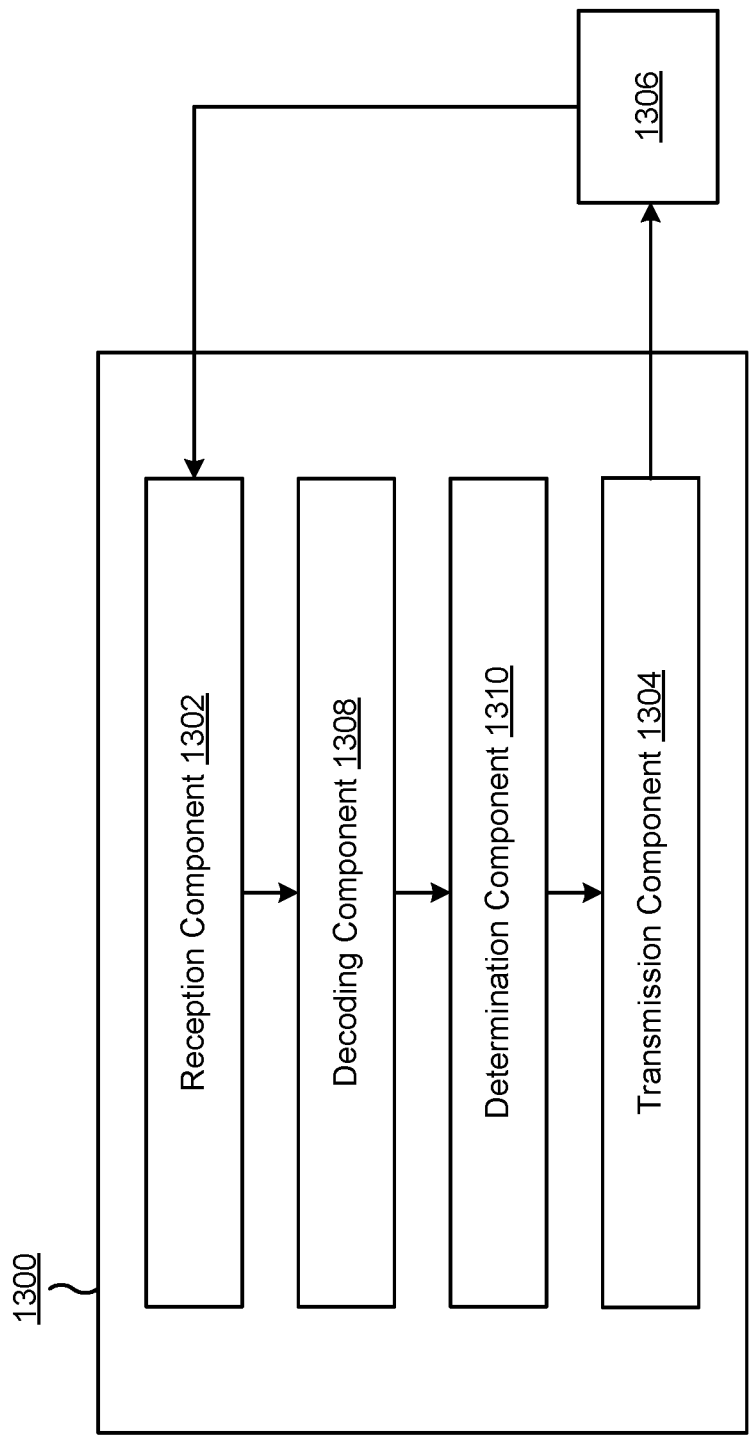

FIG. 13 is a block diagram of an example apparatus 1300 for wireless communication. The apparatus 1300 may be a base station, or a base station May include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a decoding component 1308, or a determination component 1310, among other examples.

In some aspects, the apparatus 1300 may be configured to perform one or more operations described herein in connection with FIGS. 4-7. Additionally or alternatively, the apparatus 1300 may be configured to perform one or more processes described herein, such as process 1000 of FIG. 10, process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be collocated with the reception component 1302 in a transceiver.

The reception component 1302 may receive a request, for an uplink transmission from a UE or a downlink transmission to the UE, for amplitude modulated PT-RSs. The transmission component 1304 and/or the reception component 1302 may communicate an uplink transmission or a downlink transmission based at least in part on the request.

The determination component 1310 may determine whether to transmit the downlink transmission with amplitude modulated PT-RSs based at least in part on one or more of an amount of data buffered for the downlink transmission, a size of a resource grant associated with the downlink transmission, a reference signal received power associated with the UE, or movement of the UE. In some aspects, the determination component 1310 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The reception component 1302 may receive a NACK for the amplitude modulated PT-RSs on the downlink transmission.

The transmission component 1304 may transmit a repetition of the amplitude modulated PT-RSs via a subsequent PT-RS resource.

The reception component 1302 may receive a request for a modulation and coding scheme for symbols associated with the amplitude modulated PT-RSs.

The transmission component 1304 may transmit an indication of a modulation and coding scheme for symbols associated with the amplitude modulated PT-RSs.

The reception component 1302 may receive an indication of a capability of the UE to communicate one or more of uplink transmissions or downlink transmissions with amplitude modulated PT-RSs.

The transmission component 1304 may transmit configuration information that indicates that the base station is to provide an indication of whether amplitude modulated PT-RSs is enabled.

The transmission component 1304 may transmit an indication to communicate based at least in part on amplitude modulated PT-RSs.

The reception component 1302 may receive the uplink transmission.

The determination component 1310 may determine, based at least in part on variations of amplitudes of resources associated with PT-RSs of the uplink transmission, that the uplink transmission has amplitude modulated PT-RSs. In some aspects, the determination component 1310 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The reception component 1302 and/or the decoding component 1308 may estimate, based at least in part on the amplitude modulated PT-RSs, a common phase error for the uplink transmission. In some aspects, the reception component 1302 and/or the decoding component 1308 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The reception component 1302 and/or the decoding component 1308 may attempt to extract data from the amplitude modulated PT-RSs. In some aspects, the reception component 1302 and/or the decoding component 1308 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The reception component 1302 may receive an indication of a capability of a UE to communicate one or more of uplink transmissions or downlink transmissions having amplitude modulated PT-RSs. The transmission component 1304 and/or the reception component 1302 may communicate an uplink transmission or a downlink transmission based at least in part on the indication.

The determination component 1310 may determine whether to transmit the downlink transmission with amplitude modulated PT-RSs based at least in part on one or more of an amount of data buffered for the downlink transmission, a size of a resource grant associated with the downlink transmission, a reference signal received power associated with the UE, or movement of the UE.

The reception component 1302 may receive a request, for the uplink transmission or the downlink transmission, for amplitude modulated PT-RSs.

The reception component 1302 may receive a NACK for the amplitude modulated PT-RSs on the downlink transmission.

The transmission component 1304 may transmit a repetition of the amplitude modulated PT-RSs via a subsequent PT-RS resource.

The reception component 1302 may receive a request for a modulation and coding scheme for symbols associated with the amplitude modulated PT-RSs.

The transmission component 1304 may transmit an indication of a modulation and coding scheme for symbols associated with the amplitude modulated PT-RSs.

The transmission component 1304 may transmit configuration information that indicates that the base station is to provide an indication of whether amplitude modulated PT-RSs is enabled.

The transmission component 1304 may transmit an indication to communicate based at least in part on amplitude modulated PT-RSs.

The reception component 1302 may receive the uplink transmission.

The determination component 1310 may determine, based at least in part on variations of amplitudes of resources associated with PT-RSs of the uplink transmission, that the uplink transmission has amplitude modulated PT-RSs.

The reception component 1302 and/or the decoding component 1308 may estimate, based at least in part on the amplitude modulated PT-RSs, a common phase error for the uplink transmission.

The reception component 1302 and/or the decoding component 1308 may attempt to extract data from the amplitude modulated PT-RSs.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a request to communicate an uplink shared channel transmission or a downlink shared channel transmission using amplitude modulated phase tracking reference signals (PT-RSs);
    receiving an indication of a modulation and coding scheme (MCS) for symbols associated with the amplitude modulated PT-RSs; and
    communicating the uplink shared channel transmission or the downlink shared channel transmission using the amplitude modulated PT-RSs based at least in part on the request and the MCS, wherein the amplitude modulated PT-RSs comprise a PT-RS sequence indicated by phases of the amplitude modulated PT-RSs and uplink shared channel data or downlink shared channel data that is indicated by amplitudes of the amplitude modulated PT-RSs, and wherein the amplitude modulated PT-RSs have a cyclic redundancy check (CRC) associated with hybrid automatic repeat request (HARQ) feedback for the amplitude modulated PT-RSs, wherein the CRC is distinct from a CRC associated with uplink shared channel data or downlink shared channel data not included in the amplitude modulation PT-RSs.

2. The method of claim 1, wherein communicating the downlink shared channel transmission comprises receiving the downlink shared channel transmission, and
    wherein receiving the downlink shared channel transmission comprises:
        removing a known PT-RS sequence, based at least in part on the phases of the amplitude modulated PT-RSs, from a portion of the downlink shared channel transmission received on resources allocated to the amplitude modulated PT-RSs;
        correcting a channel effect for the portion of the downlink shared channel transmission received on the resources allocated to the amplitude modulated PT-RSs;
        performing antenna combining and signal equalization for the portion of the downlink shared channel transmission received on the resources allocated to the amplitude modulated PT-RSs; and
        performing soft metric extraction, on the portion of the downlink shared channel transmission received on the resources allocated to the amplitude modulated PT-RSs, to extract data that is indicated by the amplitudes of the amplitude modulated PT-RSs.

3. The method of claim 2, wherein correcting a channel effect for the portion of the downlink shared channel transmission received on the resources allocated to the amplitude modulated PT-RSs comprises:
    correcting the channel effect based at least in part on demodulation reference signals.

4. The method of claim 1, wherein communicating the downlink shared channel transmission comprises receiving the downlink shared channel transmission, and
    wherein receiving the downlink shared channel transmission comprises:
        removing a known PT-RS sequence, based at least in part on the phases of the amplitude modulated PT-RSs, from a portion of the downlink shared channel transmission received on resources allocated to the amplitude modulated PT-RSs;
        correcting a channel effect for the portion of the downlink shared channel transmission received on the resources allocated to the amplitude modulated PT-RSs;
        aggregating the portion of the downlink shared channel transmission received on the resources allocated to the amplitude modulated PT-RSs to represent an equivalent phasor; and
        using the equivalent phasor to estimate a common phase error for the downlink shared channel transmission.

5. The method of claim 1, wherein the CRC is different from one or more CRCs associated with other data of the uplink shared channel transmission or the downlink shared channel transmission, and wherein the CRC is associated with data transmitted on resources associated with the amplitude modulated PT-RSs.

6. The method of claim 1, further comprising:
    reporting a negative acknowledgement for the amplitude modulated PT-RSs; and
    receiving a repetition of the amplitude modulated PT-RSs via a subsequent PT-RS resource.

7. The method of claim 1,
    wherein the indication of the MCS is based at least in part on one or more of:

feedback signaling associated with a previous downlink shared channel transmission having amplitude modulated PT-RSs, or
a request, by the UE, for the MCS for the symbols associated with the amplitude modulated PT-RSs.

8. The method of claim 7, wherein the indication of the MCS indicates a difference between the MCS for symbols associated with the amplitude modulated PT-RSs and a MCS for symbols associated with other data of the uplink shared channel transmission or the downlink shared channel transmission.

9. The method of claim 1, further comprising:
decoding data that is multiplexed with a PT-RS sequence on resources associated with the amplitude modulated PT-RSs based at least in part on:
a configured MCS for amplitude modulated PT-RSs of downlink shared channel transmissions; or
a configured difference of a MCS for amplitude modulated PT-RSs and a MCS for other data of downlink shared channel transmissions.

10. The method of claim 1, further comprising:
receiving configuration information that indicates that a base station is to provide an indication of whether amplitude modulated PT-RSs are enabled.

11. The method of claim 1, further comprising communicating the uplink shared channel transmission or the downlink shared channel transmission based at least in part on one or more of:
receiving an indication to communicate based at least in part on amplitude modulated PT-RSs; or
an assumption, based at least in part on transmitting the request, that the uplink shared channel transmission or the downlink shared channel transmission is to be transmitted with amplitude modulated PT-RSs.

12. The method of claim 1, further comprising:
receiving the downlink shared channel transmission;
determining, based at least in part on variations of amplitudes of resources associated with PT-RSs of the downlink shared channel transmission, that the downlink shared channel transmission has amplitude modulated PT-RSs;
estimating, based at least in part on the amplitude modulated PT-RSs, a common phase error for the downlink shared channel transmission; and
attempting to extract data from the amplitude modulated PT-RSs.

13. A method of wireless communication performed by a user equipment (UE), comprising:
transmitting an indication of a capability of the UE to communicate one or more of uplink shared channel transmissions or downlink shared channel transmissions using amplitude modulated phase tracking reference signals (PT-RSs);
receiving an indication of a modulation and coding scheme (MCS) for symbols associated with the amplitude modulated PT-RSs; and
communicating an uplink shared channel transmission or a downlink shared channel transmission using the amplitude modulated PT-RSs based at least in part on the indication and the MCS, wherein the amplitude modulated PT-RSs comprise a PT-RS sequence indicated by phases of the amplitude modulated PT-RSs and uplink shared channel data or downlink shared channel data that is indicated by amplitudes of the amplitude modulated PT-RSs, and wherein the amplitude modulated PT-RSs have a cyclic redundancy check (CRC) associated with hybrid automatic repeat request (HARQ) feedback for the amplitude modulated PT-RSs, wherein the CRC is distinct from a CRC associated with uplink shared channel data or downlink shared channel data not included in the amplitude modulation PT-RSs.

14. The method of claim 13, wherein communicating the downlink shared channel transmission comprises receiving the downlink shared channel transmission, and
wherein receiving the downlink shared channel transmission comprises:
removing a known PT-RS sequence, based at least in part on the phases of the amplitude modulated PT-RSs, from a portion of the downlink shared channel transmission received on resources allocated to the amplitude modulated PT-RSs;
correcting a channel effect for the portion of the downlink shared channel transmission received on the resources allocated to the amplitude modulated PT-RSs;
performing antenna combining and signal equalization for the portion of the downlink shared channel transmission received on the resources allocated to the amplitude modulated PT-RSs; and
performing soft metric extraction, on the portion of the downlink shared channel transmission received on the resources allocated to the amplitude modulated PT-RSs, to extract data that is indicated by the amplitudes of the amplitude modulated PT-RSs.

15. The method of claim 14, wherein correcting a channel effect for the portion of the downlink shared channel transmission received on the resources allocated to the amplitude modulated PT-RSs comprises:
correcting the channel effect based at least in part on demodulation reference signals.

16. The method of claim 13, wherein communicating the downlink shared channel transmission comprises receiving the downlink shared channel transmission, and
wherein receiving the downlink shared channel transmission comprises:
removing a known PT-RS sequence, based at least in part on the phases of the amplitude modulated PT-RSs, from a portion of the downlink shared channel transmission received on resources allocated to the amplitude modulated PT-RSs;
correcting a channel effect for the portion of the downlink shared channel transmission received on the resources allocated to the amplitude modulated PT-RSs;
aggregating the portion of the downlink shared channel transmission received on the resources allocated to the amplitude modulated PT-RSs to represent an equivalent phasor; and
using the equivalent phasor to estimate a common phase error for the downlink shared channel transmission.

17. The method of claim 13, wherein the CRC is different from one or more CRCs associated with other data of the uplink shared channel transmission or the downlink shared channel transmission, and wherein the CRC is associated with data transmitted on resources associated with the amplitude modulated PT-RSs.

18. The method of claim 13, further comprising:
reporting a negative acknowledgement for the amplitude modulated PT-RSs; and
receiving a repetition of the amplitude modulated PT-RSs via a subsequent PT-RS resource.

19. The method of claim 13,
wherein the indication of the MCS is based at least in part on one or more of:
feedback signaling associated with a previous downlink shared channel transmission having amplitude modulated PT-RSs, or
a request, by the UE, for the MCS for the symbols associated with the amplitude modulated PT-RSs.

20. The method of claim 19, wherein the indication of the MCS indicates a difference between the MCS for symbols associated with the amplitude modulated PT-RSs and a MCS for symbols associated with other data of the uplink shared channel transmission or the downlink shared channel transmission.

21. The method of claim 13, further comprising:
decoding data that is multiplexed with a PT-RS sequence on resources associated with the amplitude modulated PT-RSs based at least in part on:
a configured MCS for amplitude modulated PT-RSs of downlink shared channel transmissions, or
a configured difference of a MCS for amplitude modulated PT-RSs and a MCS for other data of downlink shared channel transmissions.

22. The method of claim 13, further comprising:
receiving configuration information that indicates that a base station is to provide an indication of whether amplitude modulated PT-RSs is enabled.

23. The method of claim 13, further comprising communicating the uplink shared channel transmission or the downlink shared channel transmission based at least in part on one or more of:
receiving an indication to communicate based at least in part on amplitude modulated PT-RSs; or
an assumption, based at least in part on transmitting the indication of the capability, that the uplink shared channel transmission or the downlink shared channel transmission is to be transmitted with amplitude modulated PT-RSs.

24. The method of claim 13, further comprising:
receiving the downlink shared channel transmission;
determining, based at least in part on variations of amplitudes of resources associated with PT-RSs of the downlink shared channel transmission, that the downlink shared channel transmission has amplitude modulated PT-RSs;
estimating, based at least in part on the amplitude modulated PT-RSs, a common phase error for the downlink shared channel transmission; and
attempting to extract data from the amplitude modulated PT-RSs.

25. A user equipment (UE) for wireless communication, comprising:
one or more memories; and
one or more processors coupled to the one or more memories, the one or more processors configured to:
transmit a request to communicate an uplink shared channel transmission or a downlink shared channel transmission using amplitude modulated phase tracking reference signals (PT-RSs);
receive an indication of a modulation and coding scheme (MCS) for symbols associated with the amplitude modulated PT-RSs; and
communicate the uplink shared channel transmission or the downlink shared channel transmission using the amplitude modulated PT-RSs based at least in part on the request and the MCS, wherein the amplitude modulated PT-RSs comprise a PT-RS sequence indicated by phases of the amplitude modulated PT-RSs and uplink shared channel data or downlink shared channel data that is indicated by amplitudes of the amplitude modulated PT-RSs, and wherein the amplitude modulated PT-RSs have a cyclic redundancy check (CRC) associated with hybrid automatic repeat request (HARQ) feedback for the amplitude modulated PT-RSs, wherein the CRC is distinct from a CRC associated with uplink shared channel data or downlink shared channel data not included in the amplitude modulation PT-RSs.

26. The UE of claim 25, wherein the CRC is different from one or more CRCs associated with other data of the uplink shared channel transmission or the downlink shared channel transmission, and wherein the CRC is associated with data transmitted on resources associated with the amplitude modulated PT-RSs.

27. The UE of claim 25, wherein the one or more processors are further configured to:
receive configuration information that indicates that a base station is to provide an indication of whether amplitude modulated PT-RSs are enabled.

28. A user equipment (UE) for wireless communication, comprising:
one or more memories; and
one or more processors coupled to the one or more memories, the one or more processors configured to:
transmit an indication of a capability of the UE to communicate one or more of uplink shared channel transmissions or downlink shared channel transmissions using amplitude modulated phase tracking reference signals (PT-RSs);
receive an indication of a modulation and coding scheme (MCS) for symbols associated with the amplitude modulated PT-RSs; and
communicate the uplink shared channel transmission or the downlink shared channel transmission based at least in part on the indication and the MCS, wherein the amplitude modulated PT-RSs comprise a PT-RS sequence indicated by phases of the amplitude modulated PT-RSs and uplink shared channel data or downlink shared channel data that is indicated by amplitudes of the amplitude modulated PT-RSs, and wherein the amplitude modulated PT-RSs have a cyclic redundancy check (CRC) associated with hybrid automatic repeat request (HARQ) feedback for the amplitude modulated PT-RSs, wherein the CRC is distinct from a CRC associated with uplink shared channel data or downlink shared channel data not included in the amplitude modulation PT-RSs.

29. The UE of claim 28, wherein the CRC is different from one or more CRCs associated with other data of the uplink shared channel transmission or the downlink shared channel transmission, and wherein the CRC is associated with data transmitted on resources associated with the amplitude modulated PT-RSs.

30. The UE of claim 28, wherein the one or more processors are further configured to:
receive configuration information that indicates that a base station is to provide an indication of whether amplitude modulated PT-RSs are enabled.

* * * * *